(12) United States Patent
Harrington

(10) Patent No.: US 7,306,757 B2
(45) Date of Patent: *Dec. 11, 2007

(54) METHODS AND APPARATUS FOR REPLICATING ORIGINAL OBJECTS

(75) Inventor: Bruce E. Harrington, Louisville, CO (US)

(73) Assignee: PolyRock Technologies, LLC, Greenwood Village, CO (US)

( * ) Notice: Subject to any disclaimer, the term of this patent is extended or adjusted under 35 U.S.C. 154(b) by 379 days.

This patent is subject to a terminal disclaimer.

(21) Appl. No.: 10/460,603

(22) Filed: Jun. 12, 2003

(65) Prior Publication Data

US 2004/0070106 A1 Apr. 15, 2004

Related U.S. Application Data

(63) Continuation-in-part of application No. 10/236,667, filed on Sep. 6, 2002, and a continuation-in-part of application No. 09/148,241, filed on Sep. 4, 1998, now Pat. No. 6,607,683.

(60) Provisional application No. 60/409,686, filed on Sep. 9, 2002.

(51) Int. Cl.
   *B29C 33/38* (2006.01)
(52) U.S. Cl. ............... 264/245; 264/220; 264/225; 264/226; 264/227; 264/338
(58) Field of Classification Search ............ 264/219, 264/220, 225, 226, 227, 297.3, 245, 338
See application file for complete search history.

(56) References Cited

U.S. PATENT DOCUMENTS

| | | |
|---|---|---|
| 3,641,228 A | 2/1972 | Fleck |
| 3,723,584 A | 3/1973 | Nussbaum |
| 3,883,627 A | 5/1975 | Fitts |
| 4,025,267 A * | 5/1977 | Amato et al. ............ 425/236 |
| 4,381,963 A | 5/1983 | Goldstein et al. |
| 4,385,088 A | 5/1983 | Baskin |
| 4,483,813 A | 11/1984 | Longo |
| 4,529,562 A | 7/1985 | Connett et al. |
| 4,735,754 A | 4/1988 | Buckner |

(Continued)

FOREIGN PATENT DOCUMENTS

EP 0985507 3/2000

OTHER PUBLICATIONS

Bob Hamon, *Manufacturing Polyurethane Picture Frames*, Feb. 2000, pp. 74-79.

*Primary Examiner*—Allan R. Kuhns
(74) *Attorney, Agent, or Firm*—John R. Ley

(57) ABSTRACT

Methods and apparatus for producing cast articles with characteristics of original objects such as a stone panel. The cast articles can replicate the contours, textures, and colors of all or a portion of the original object and can be made in any shape or size and specifically can be formed to simulate rock walls, carved stone architecture details, and other construction components normally created by stone masons or sculptors on site and at a high cost. The processes used in making the cast articles include the production of a series of molds. The molds seek to replicate the size, shape, contour, and surface texture of an original object with or without modifications to the original object.

66 Claims, 26 Drawing Sheets

U.S. PATENT DOCUMENTS

| | | |
|---|---|---|
| 4,752,229 A | 6/1988 | Clingerman et al. |
| 4,860,815 A | 8/1989 | Parker et al. |
| 4,940,558 A | 7/1990 | Jarboe et al. |
| 4,960,622 A | 10/1990 | Jarboe et al. |
| 5,250,250 A | 10/1993 | Gorski |
| 5,268,137 A | 12/1993 | Scott et al. |
| 5,372,869 A | 12/1994 | Drexinger et al. |
| 5,380,478 A | 1/1995 | East |
| 5,543,100 A | 8/1996 | Kluh et al. |
| 5,750,583 A | 5/1998 | Gansen et al. |
| 5,911,927 A | 6/1999 | Roberts |
| 6,042,766 A | 3/2000 | Bahr |
| 6,139,786 A | 10/2000 | Corry |
| 6,158,497 A * | 12/2000 | Lange et al. ................. 164/456 |
| 6,228,304 B1 * | 5/2001 | Silbergeld .................... 264/225 |
| 6,607,683 B1 | 8/2003 | Harrington |

* cited by examiner

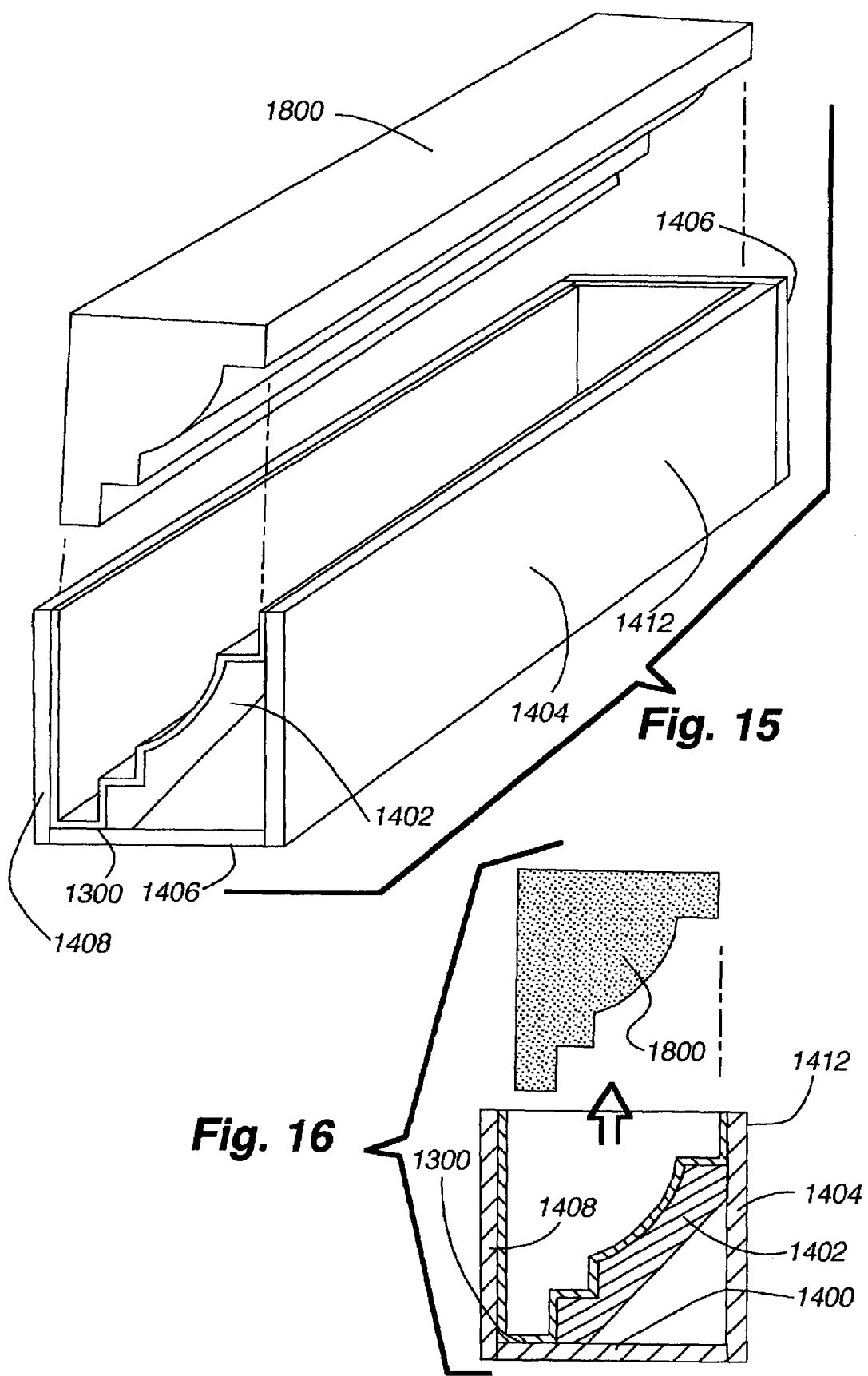

METHODS AND APPARATUS FOR REPLICATING ORIGINAL OBJECTS

RELATED APPLICATIONS

This application is a continuation-in-part of U.S. patent application Ser. No. 10/236,667 filed Sep. 6, 2002 and a continuation-in-part of U.S. patent application Ser. No. 09/148,241 filed Sep. 4, 1998, now U.S. Pat. No. 6,607,683. This application also claims the benefit of U.S. Provisional Patent Application Serial No. 60/409,686 filed Sep. 9, 2002. These applications are incorporated herein by reference.

BACKGROUND OF THE INVENTION

1. Field of the Invention

The invention relates to the general field of methods and apparatus for replicating the characteristics of an original object such as a stone or stone panel in a cast article. More particularly, the invention relates to the field of such methods and apparatus further incorporating into the cast article useful shapes and properties not present in the original object but normally helpful in constructing commercial structures such as facades and walls from the cast articles.

2. Discussion of the Background

Many people have attempted to manufacture items simulating the contours and colors of an original object such as a natural article, but produce an item that either does not look authentic or poorly reproduces the original object in its entirety. One example is Formica®, a hard plastic substrate used to cover countertops and the like. Some forms of Formica® were impregnated during manufacture with dyes or other colored material to simulate the look of wood or stone. However, the simulation was not convincing because the Formica® was flat. Also, it did not have the texture of the original object it purported to simulate.

Another example is Corian®. This was made from plastic in the form of sheets of varying thickness for use as countertops and related structures. Most forms of Corian® were made by mixing filler materials with plastic and the resulting product was colored much like the filler material used during manufacture. Some forms of Corian® were made to resemble stone. However, the simulation was not appealing because Corian® was largely flat and it also did not have the texture of the natural articles it purported to simulate.

Yet another example is Linoleum®. This was made from various plastics and fillers and was sold in the form of sheets or rolls, principally for covering floors with a wear-resistant surface. While some forms of Linoleum® were colored and textured to resemble natural articles, the simulation was still not convincing. The colors were artificial and the texture so regular as to dispel the notion of a natural articles.

Still another example is plastic floor tiles. These were typically squares of regular size. They were intended to be butted against one another once a mastic had been applied, and some were both colored and textured to resemble natural articles. However, the colors were often unconvincing. Further, the same was true for the textures, which were not only shallow but also discontinuous where one tile butted up against another.

Another example is exterior siding designed to replace or cover some or all of the exterior of outdoor structures, including houses. This siding typically was made of plastic or aluminum and was marked or embossed in an effort to simulate natural articles. However, the simulation was not appealing. The colors were unconvincing and the textures were not only shallow and unrealistic but also discontinuous where one piece of siding butted up against another.

Another example is cultured stone. This was cast from cement and aggregate and simply mimicked the characteristics of real stone. It could not be molded any differently from the natural article and required the same methods for installation as real stone.

Processes for casting plastics are disclosed in U.S. Pat. No. 5,750,583 to Gansen et al. and U.S. Pat. No. 3,883,627 to Fitts. Gansen et al. disclosed a process for the preparation of polyurethane products in which a plastic film was positioned in a mold, the mold was closed, a polyurethane reaction mixture was injected into the mold, and the product was removed from the mold once the reaction mixture had fully reacted.

Fitts disclosed a process in which a heat curable elastomeric sheet comprising a curing agent and either urethane elastomeric gum stock or silicone gum stock was placed over a master to be copied. The heat curable elastomeric sheet was one that did not cause inhibition between the master and the heat curable elastomeric sheet. Next, the elastomeric sheet was vacuum drawn against the master and the master sheet material was enclosed in a frame. A foamed polymeric backing was then formed in situ to force the heat curable elastomeric sheet against the master to copy the shape of the master. The heat curable elastomeric sheet was then cured in the shape of the master. Finally, articles were molded in the shape of the master in a mold constructed from the cured elastomeric sheet material.

A decorative plastic moulding was disclosed in U.S. Pat. No. 5,372,869 to Drexinger et. al. The moulding comprised two moulding pieces, each with a decorative face, a back, two sides, and two ends. Each end of each piece had a 45 degree angle pre-mitered cut relative to the plane of the decorative face, with the pre-mitered cuts of each piece being in parallel planes. Each side of each piece was in a plane at a 45 degree angle to the plane of the decorative face, with the side planes converging at a position spaced from the back of the piece. The two moulding pieces were made of fire rated polyurethane.

Finally, a method for molding an artificial rock was disclosed in U.S. Pat. No. 4,940,558 to Jarboe et. al. This method entailed selecting a rock for reproduction and creating a flexible rubber mold and supporting cradle having a mold cavity conforming to the exterior of the rock. The mold has a substantial degree of flexibility and is created by applying an uncured liquid rubber forming material to the rock and curing the uncured liquid rubber forming material to produce the rubber mold. The cradle is formed by applying or spraying a low density urethane foam forming mixture to the exterior of the rubber mold to provide a self-supporting cradle and spraying a two-sided urethane composition into the mold cavity. The urethane composition comprises an isocyanate side and a polyol side and is mixed in a spray gun in a spray-in-mold process to build up the molded artificial rock to a desired thickness. The cradle and mold are then stripped away after curing.

SUMMARY OF THE INVENTION

The present invention involves methods and apparatus for producing cast articles with characteristics of original objects such as a stone panel. The cast articles can replicate the contours, textures, and colors of all or a portion of the original object and can be made in any shape or size and specifically can be formed to simulate rock walls, carved stone architecture details, and other construction components normally created by stone masons or sculptors on site and at a high cost. The processes used in making the cast articles include the production of a series of molds. The molds seek to replicate the size, shape, contour, and surface texture of an original object with or without modifications to the original object. For example, the original object may be a wall with multiple and different stone sections as would occur if a stone mason created a wall from individual stones. It may also be an architectural piece such as a carved stone element with a natural outward appearance in a customized shape. A master reproduction is used in this invention to form molds from which commercial quantities of cast articles can be made.

The general procedures and materials specifically disclosed herein have wide application. In most of the embodiments, an original object is physically placed in a frame to make a mold. However, rather than binging or modifying an original object (natural or manmade) to fit within the confines of such a frame, an impression can be taken of at least a portion of the original object where it is located. In this regard, an impression of a portion of a large object found in nature (e.g., a portion of a huge, immovable stone, boulder, etc.) could be taken in the field. To this end, an open faced box could be securely held, or constructed, around a portion of the object that one desires to replicate. The securely held box could then be sealed around its open face edges and filled with a first impressionable material. This first impressionable material could be a flowable mold making material such as a semi-liquid silicone that, upon curing or drying (in the box), captures the surface morphology, texture, etc. of the object to be replicated. This first impressionable material could also be a precursor to an inflexible material (e.g., a polymeric material or a non-polymeric material) such as those used to create certain hereinafter more fully described thermosetting polymeric materials. These impressionable materials are capable of replicating the surface morphology, texture, etc. of a solid object they contact while in a semi-fluid (impressionable) state. They then maintain that surface morphology, texture, etc. after the originally impressionable material has cured, dried, cooled, etc., and been removed from its impression-forming contact with the solid object it replicates. In a less preferred, but still operable embodiment of these alternative procedures, such impressionable materials could even be a non-polymeric material (e.g., a crystalline material) such as plaster of Paris.

Many of the preferred embodiments of this invention involve taking impressions of manmade objects (e.g., bricks, manmade carvings in the face of a block of marble, wood, metal, thermoset resin, ceramic material, etc., three dimensional manmade objects such as castings of objects of art, mold parts, etc.). In such cases, a resulting impression-bearing first mold material can be employed in ways hereinafter described in order to produce a master reproduction. A final product or cast article bearing a replication of the surface morphology of the original object (be it a natural or manmade object) can then be made. Generally speaking, the herinafter decscribed processes for making a final product or cast article that replicates a portion of a surface of the original object may comprise: (1) making a first mold that replicates at least part of the surface of the original object, (2) filling the first mold with a first castable material to produce a cast reproduction, (3) modifying the cast reproduction to form a master reproduction, (4) making a second mold that replicates at least part of the surface of the master reproduction, (5) filling the second mold with a second castable material, and (6) curing the second castable material to produce a cast article that replicates at least a portion of the surface of the original object.

One particularly preferred process for making the cast articles that replicate the surface of an original object such as a natural article comprises the steps of modifying the original object to a predetermined size and configuration (such as cutting two or more stones to fit together or to carve a piece of stone) and thereafter making a mold of at least part of the modified original object (e.g., modified natural article). The mold is then filled with a castable material to produce a cast reproduction of at least part of the surface of the modified original object (e.g., modified natural article). Next, the reproduction may be modified for construction and installation purposes to a predetermined size and configuration to make a master reproduction. The final cast article may then be made from a mold replicating at least a part of the surface of the master reproduction.

Another method of the invention involves making reproductions or cast articles of architectural details, such as cornices or moldings that replicate the surface of a natural article (e.g., stone). The method comprises the steps of making a mold of at least part of the surface of the stone and then lining the inner surface of a support structure with the mold. The support structure with the surface mold is filled with castable material creating a master reproduction with the replicated stone surface texture incorporated into the casting in the three-dimensional shape desired.

Apparatus of the invention as disclosed can be used in systems for the production of cast articles that replicate the surface of an original object. These systems include two types. One is a continuous conveyor system and a second is a single mold operation that is individually filled. These may be placed in a multiple mold stack for curing or cured individually with or without pressure. The conveyor system comprises a conveyor, one or more molds positioned on the conveyor (each of which molds replicates on at least part of its surface the surface of the original object), a dispenser positioned adjacent to the conveyor for filling one or more of the molds with a castable material, and second conveyor positioned adjacent to the first conveyor for substantially confining the castable material to the molds. This system can further comprise one or more dispensers of castable material, liquid or powdered coloring agents secondary additives, such as UV blockers, or solvent positioned adjacent to the first conveyor, as well as a heater for heating the molds and drying any paint, coloring agent or solvent placed in them. In another method, the curing may occur in separate closable support structures, with or without pressure systems. These may be individual or aggregated for efficiency and production.

These methods and apparatus can be practiced or configured in a number of variations. For example, molds can be placed in closable support structures to facilitate casting of the article. The closable support structure can be made of metal, wood, plastic or the like and lined with an inert material to prevent adhesion of castable material to the rigid support structure.

The cast articles can be colored by placing a powdered or liquid coloring agent (or both) into the mold before the mold is filled with castable material. In another variation, a coloring agent is mixed into the castable material before the mold is filled with the castable material. Additional additives may be added if desired for purposes of protecting against environmental or other conditions.

BRIEF DESCRIPTION OF THE DRAWINGS

FIG. 1 depicts three pieces of a natural article, in this case stone, cut to appropriate size and set side by side to form a panel or portion of a wall.

FIG. 2 depicts the stone pieces surrounded by a wooden dam and with silicone poured over the stones.

FIG. 3 depicts a first mold after it is removed from a frame such as in FIG. 2.

FIG. 4 depicts a master reproduction made from the mold of FIG. 3 and subsequently modified to generate a master reproduction by removing material to form undercuts and creating extensions for use in production and installation.

FIG. 5 depicts a detail of the undercut of FIG. 4.

FIG. 6 depicts a detail of the fit between two polyurethane reproductions showing the undercut and extensions.

FIG. 7 depicts a second mold made from the master reproduction of FIG. 4.

FIG. 8 depicts the second mold placed in a closable support structure.

FIGS. 9 through 24 below relate to two other embodiments of the invention of this application:

FIG. 9 depicts a piece of stone onto which a castable material such as silicone has been poured.

FIG. 10 depicts the removal from the stone of the silicone mold of FIG. 9 after it has cured.

FIG. 11 depicts a preshaped wooden mold or master part of an architectural detail lined with the silicone mold, such as in FIG. 10, used in forming the architectural details such as cornices or moldings.

FIG. 12 depicts a side view of the assembly of FIG. 11.

FIG. 13 depicts the assembly of FIG. 12 filled with castable material to make a master reproduction.

FIG. 14 depicts a side view of the assembly of FIG. 13.

FIG. 15 depicts the removal of the master reproduction from the assembly of FIG. 13.

FIG. 16 depicts a side view of the removal of the master reproduction from the assembly of FIG. 13

FIG. 17 depicts the master reproduction,

FIG. 18 is a side view of the master reproduction of FIG. 17 supported by on a wooden board.

FIG. 19 depicts the master reproduction of FIG. 17 placed into a second support structure into which silicone has been poured to form a mold.

FIG. 20 depicts the resulting silicone mold placed in a closable steel support structure.

FIG. 21 depicts the assembly of FIG. 20 filled with castable material to produce a cast article.

FIG. 22 illustrates a characteristic of the flexible mold in that it can be manipulated into alternate shapes.

FIG. 23 illustrates a mold for corner pieces.

FIG. 24 illustrates corner pieces of a rock wall cast from a mold such as in FIG. 23.

DETAILED DESCRIPTION OF THE INVENTION

Figure 1:
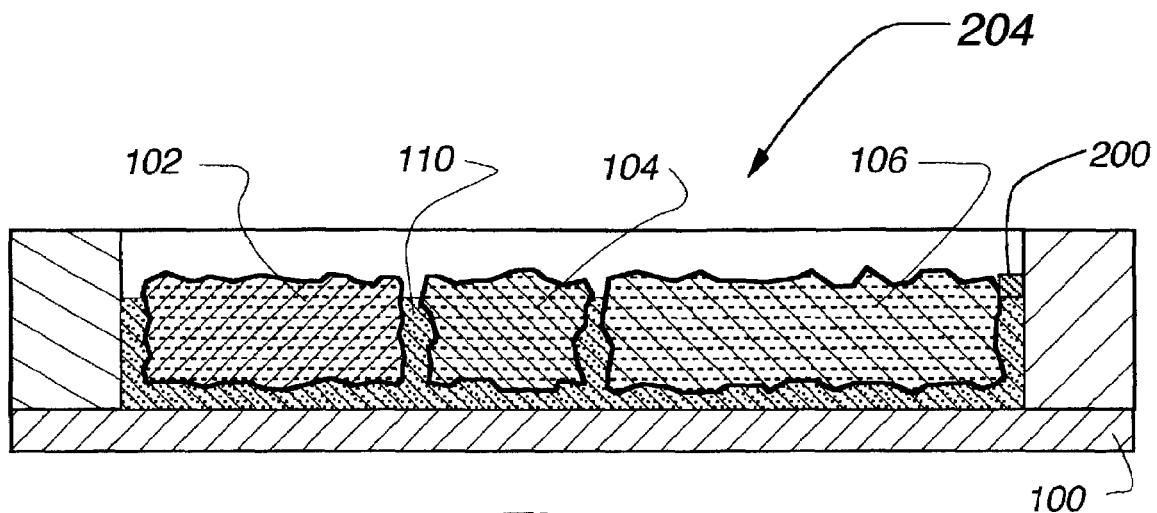
FIGS. 1 through 8 below relate to one embodiment of the invention of this application.

While the invention is susceptible to various modifications and alternative forms, specific embodiments are shown by way of example in the drawings and are described in detail below. The description and drawings are not intended to limit the invention to the particular embodiments disclosed. On the contrary, the invention embraces all modifications, equivalents, and alternatives falling within the spirit and scope of the invention as defined by the appended claims.

FIGS. 1 through 8 depict one preferred embodiment of the invention of this application. The process described is for making flat panel reproductions for use in structures. These panels replicate the surface of an original object such as a natural stone panel in a form that would be difficult and expensive to make with natural stone and would require a stone mason to design and build onsite.

In FIG. 1, natural articles such as flagstones 102, 104 and 106 are first selected, altered, and arranged to create a modified natural article (i.e., stone panel 204) supported by wooden board 100. As shown, grout 110 has been placed in the spaces between flagstones 102, 104 and 106. Wooden grout strips 200 have also been added along the sides of flagstones 102, 104 and 106 to facilitate the production of replicates that will lock together when assembled in quantity. The stone panel 204 has been walled in with wood strips 300 that form a perimeter for a liquid mold material 400 (see FIG. 2) that will be subsequently poured into the receptacle made up of stone panel 204 and the frame of wood strips 300. The uncured silicone 400 of FIG. 2 may be treated with a vacuum to eliminate any bubbles prior to being poured.

Figure 2:
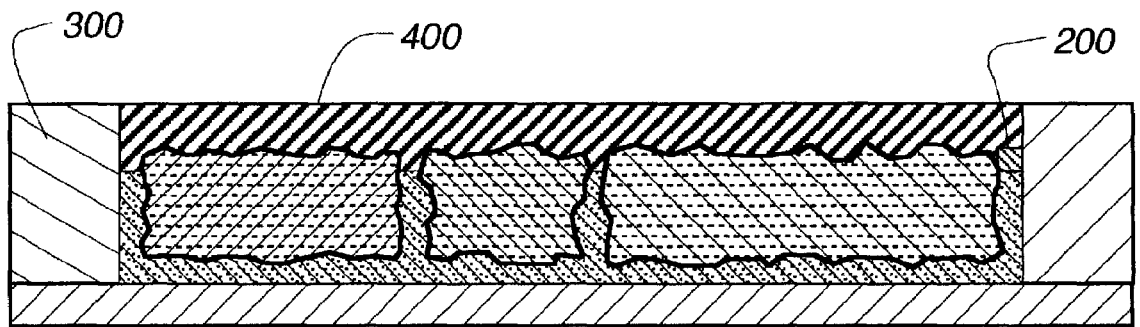
Figure 3:
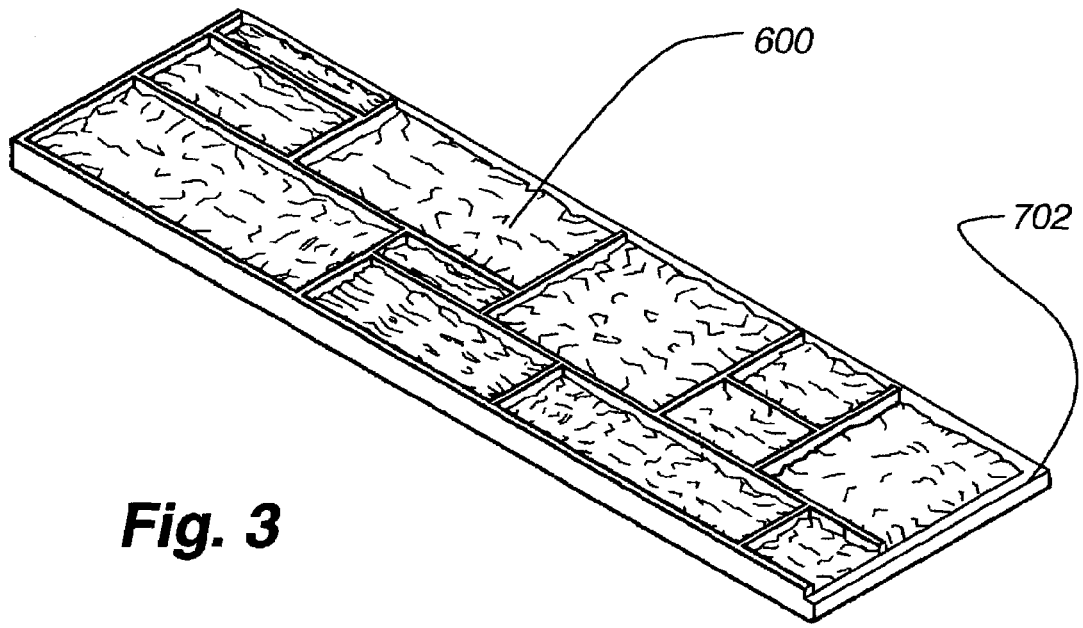

FIG. 3 illustrates the first flexible mold 600 which is formed after the poured silicone of 400 of FIG. 2 has cured and been lifted off the stone panel 204. The mold 600 as shown depicts the negative impression of the surface of the stone panel 204. This first mold 600 is then filled with a first castable material, such as expandable polyurethane plastic, to form a first cast reproduction that duplicates the surface texture and major contours of the original object (i.e., the stone panel 204) and any grout surfaces.

Figure 4:
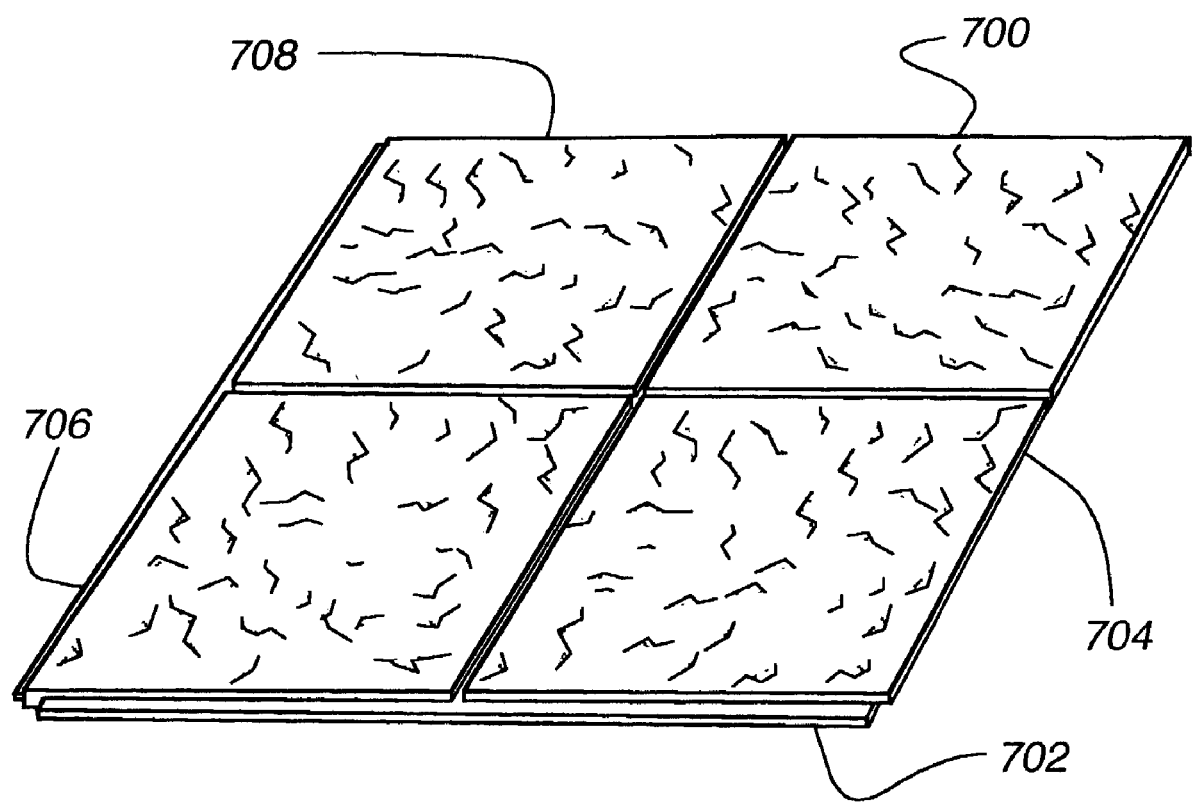
Figure 5:
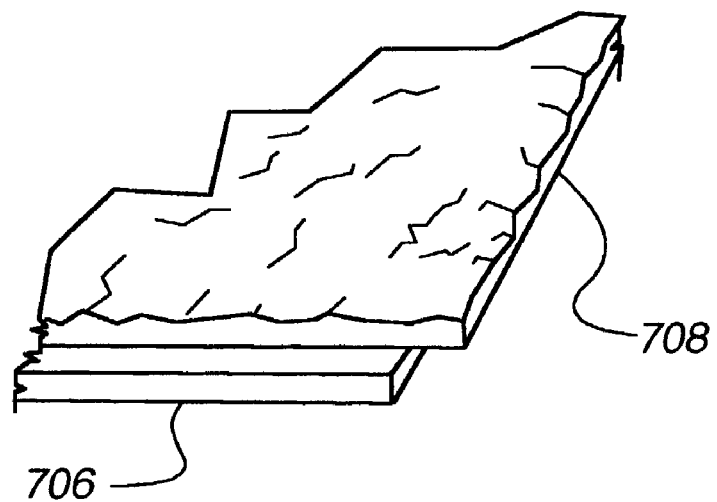
Figure 6:
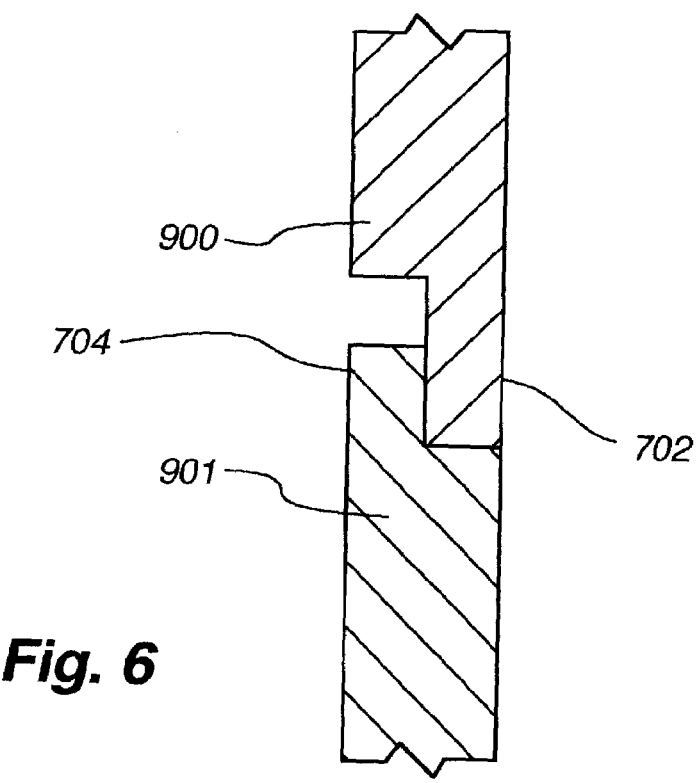

FIG. 4 depicts a first master reproduction 700 made from a substantially square mold in essentially the same manner that the rectangular mold 600 of FIG. 3 was created. Extensions 702 and 706 in FIG. 4 are formed by grout strips like 200 in FIG. 2. In addition, sides 704 and 708 of panel 700 have been undercut. Panel 700 as modified with undercuts 704 and 708 can also be used herein as a master reproduction. This undercutting can be accomplished by any known method for removing material from a panel including milling, sawing, knife cutting, and laser cutting. A detail of the undercut is shown in FIG. 5 with FIG. 6 depicting how an adjacent extension 702 and undercut 704 of final cast articles 900 and 901 made according to the processes herein will overlap when placed against one another.

Figure 7:
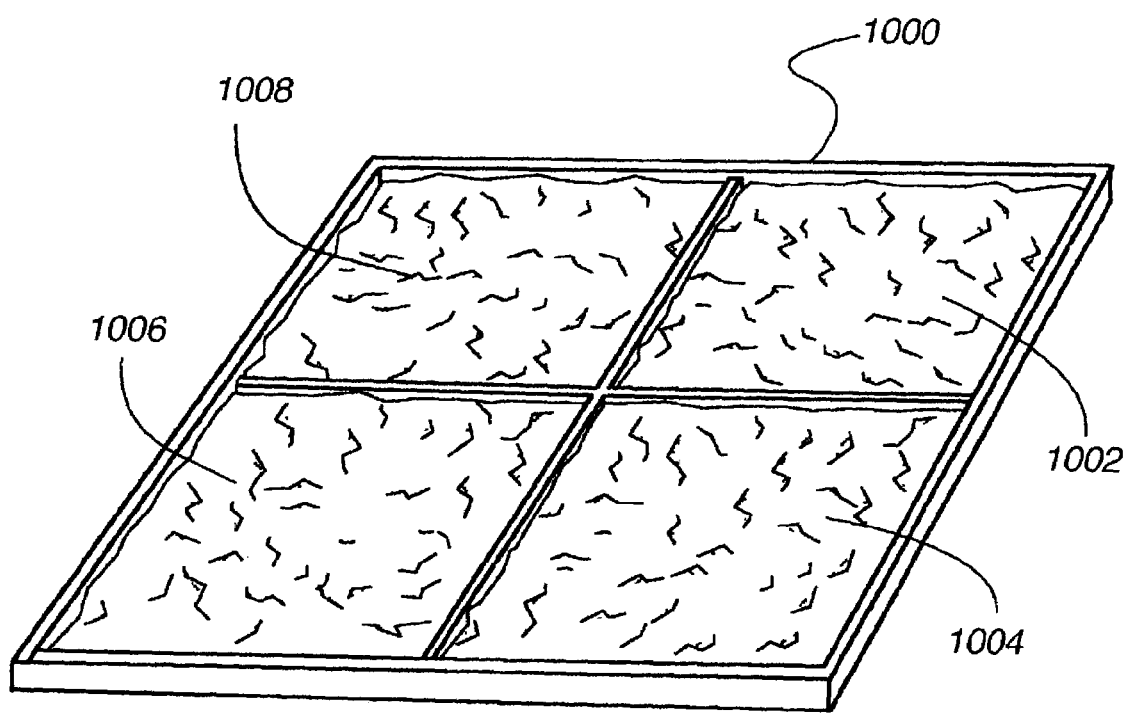

FIG. 7 depicts a second mold 1000 made from a first master reproduction such as panel 700 in FIG. 4. Mold 1000 has cavities 1002, 1004, 1006 and 1008 corresponding to stones in an original panel. Mold 1000 was made using essentially the same procedures as those followed to make rectangular mold 600, except that outer grout strips 200 were not added.

Figure 8:
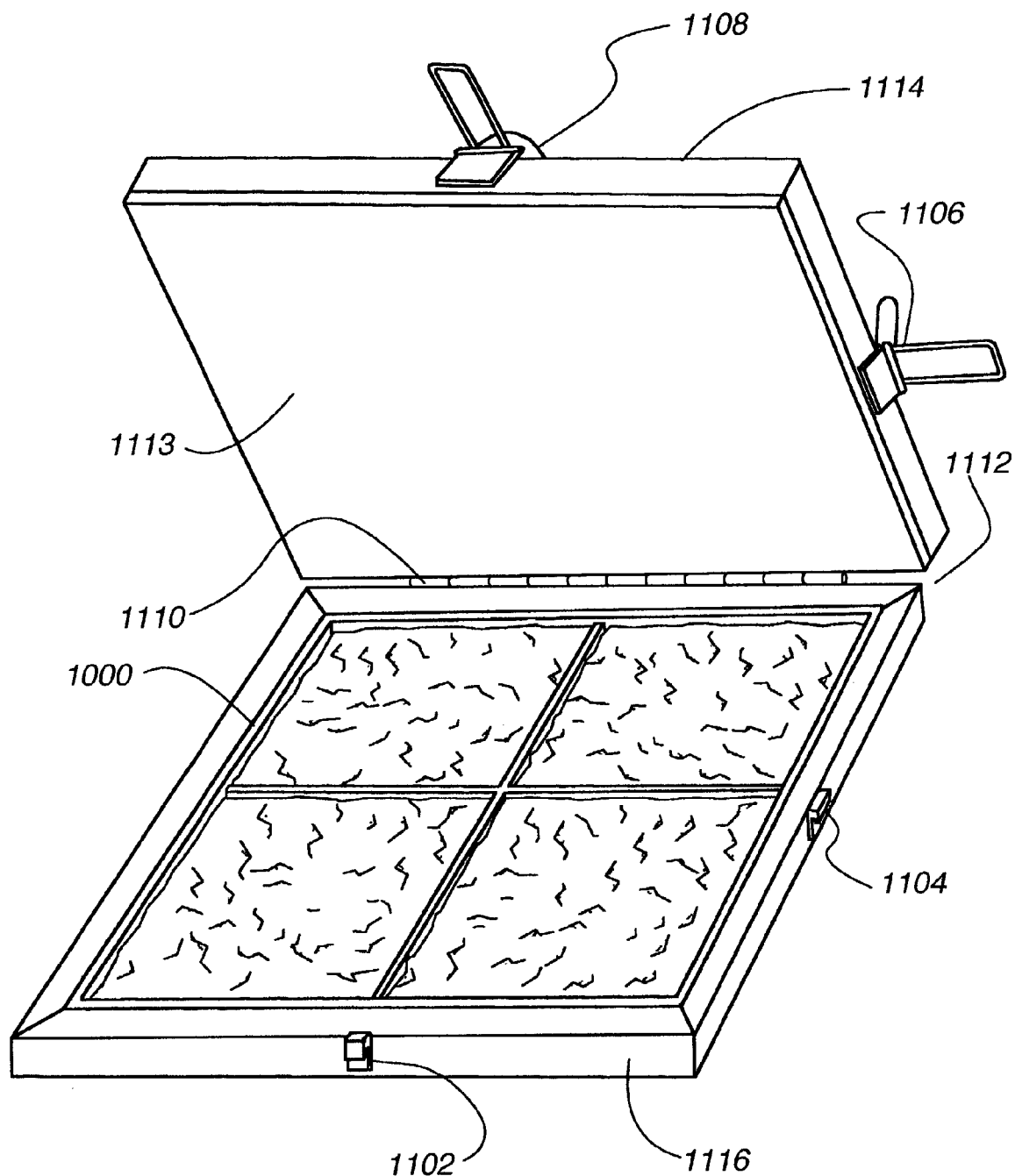

In FIG. 8, mold 1000 has been placed in a closable support structure 1112, which in turn is made up of steel subframes 1114 and 1116 which are rotatably connected by hinge 1110. Upper subframe or top 1114 is fitted with a sheet of inert plastic 1113 to prevent the polyurethane or other castable material from adhering thereto. The curing may be accomplished without a closable support structure if desired. Additionally, with some castable materials such as expansible foam plastics, the closable support structure may apply pressure to the mold during cure.

In practice, a cast article is made by filling lower subframe 1116 with an uncured, second castable material such as polyurethane plastic and rotating subframe or top 1114 to cover subframe 1116. Latches 1106 and 1108 are then engaged with brackets 1102 and 1104 and closed to effect a tight engagement between subframes 1114 and 1116. Inert material such as plastic sheet 1113 prevents the uncured polyurethane plastic from sticking to subframe 1114. Once the second castable material has cured, latches 1106 and 1108 are disengaged from brackets 1102 and 1104, subframe 1114 is rotated away from subframe 1116, and the cast article is removed from subframe 1116.

A polyurethane plastic, cast article made as described above can be colored on the side that replicates some or all of the cavities of mold 1000. In one such method of coloring, one or more powdered cement or ferric oxide dyes or other powdered coloring agents are placed in a predetermined or random pattern into at least one of the cavities 1002, 1004, 1006, and 1008 of mold 1000 of FIGS. 7 and 8. The best coloring agent is powdered ferric oxide which can be in many different colors. For best results, use of multiple colors randomly sprinkled into the cavities gives the appearance of natural coloring and weathering. A fine mist of a wetting agent such as water or denatured alcohol can then sprayed or brushed over the coloring agent or agents until the powder dissolves or is wetted. The cavity or cavities of mold 1000 so treated are then dried. When the second castable material or polyurethane plastic is introduced into mold 1000, the coloring agent or agents become part of the surface of the uncured polyurethane plastic, resulting in a polyurethane cast article that is partially or wholly colored on the surface that replicates the contours of mold 1000. This is illustrated and discussed later in conjunction with FIG. 26.

In another method of coloring, a second castable material, one or more coloring agents such as paints or powders can be introduced in a predetermined or random pattern into at least one of the cavities of mold 1000. The cavity or cavities of mold 1000 so treated are then dried. When uncured polyurethane plastic is introduced into mold 1000, the dried paints or powders are picked up by the uncured polyurethane plastic, resulting in a cast article that is partially or wholly colored on the surface that replicates the contours of mold 1000.

In yet another method of coloring a cast article, one or more liquid or powdered cement dyes or other powdered coloring agents are mixed with the second castable material before being introduced into mold 1000. After the material such as uncured polyurethane plastic is introduced into the mold 1000 and cured, the resulting cast article is uniformly colored both internally and externally. In all of these methods, the powder or liquid may include protective additives to aid the resistance of weathering or other deleterious environmental conditions for the cast article. This may be an ultraviolet blocking agent or some other material to protect against any undesirable conditions.

FIGS. 9 through 24 depict another preferred embodiment of the invention of this application. The process described is for making three-dimensional replicas. These replicas reproduce desirable surface textures of the original object (e.g., natural stone) in a form that would be difficult or impossible to make in natural stone. The final cast article then appears to be three-dimensional stone with the desirable texture on the outside.

Figure 9:
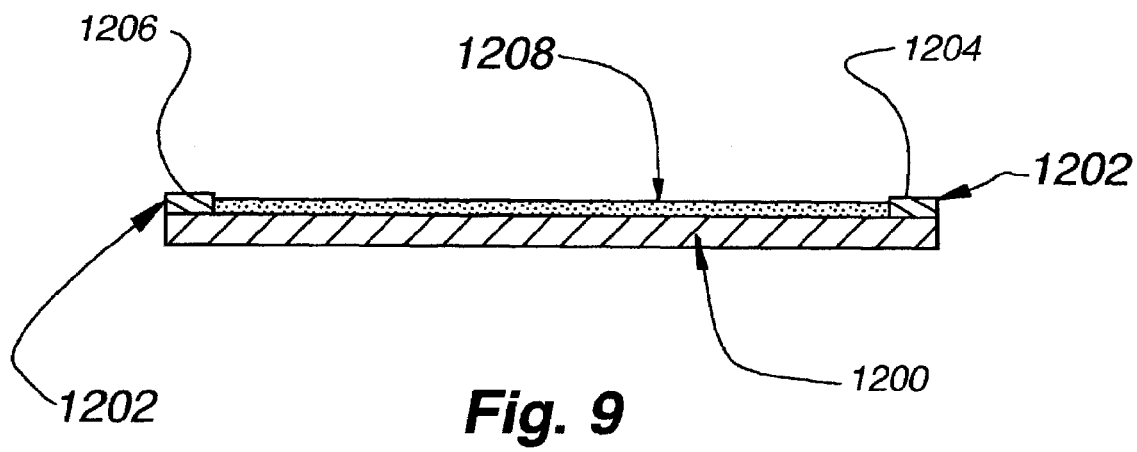

FIG. 9 depicts the first step in making a flexible silicone mold of the stone 1200 bearing the surface of the natural article for replication. Stone 1200 as illustrated is fitted with a dam 1202 on the upper surface thereof. The parts of dam 1202 visible in the side view of FIG. 9 are wood strips 1204 and 1206. Dam 1202 serves to contain the uncured silicone 1208 poured onto stone 1200 in FIG. 9.

Figure 10:
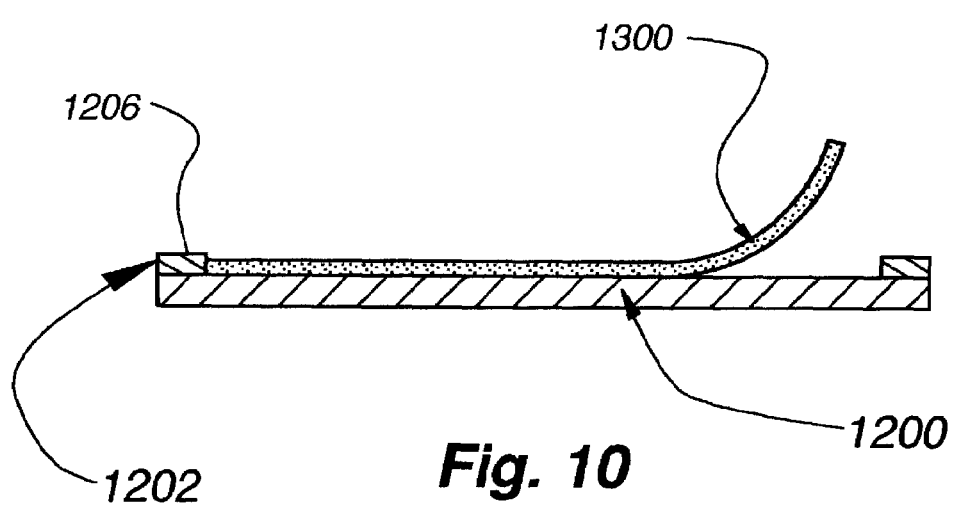

In FIG. 10, the uncured silicone 1208 of FIG. 9 has cured into the first flexible mold 1300 of FIG. 10. To aid in lifting the mold 1300 off the stone 1200, the dam 1202 can be opened as shown in FIG. 10 by removing the wood strip 1204 of FIG. 9. This mold 1300 then replicates the desired texture of the surface of the stone 1200 which may be weathered limestone, porous marble or etched or carved graphics and designs.

Figure 11:
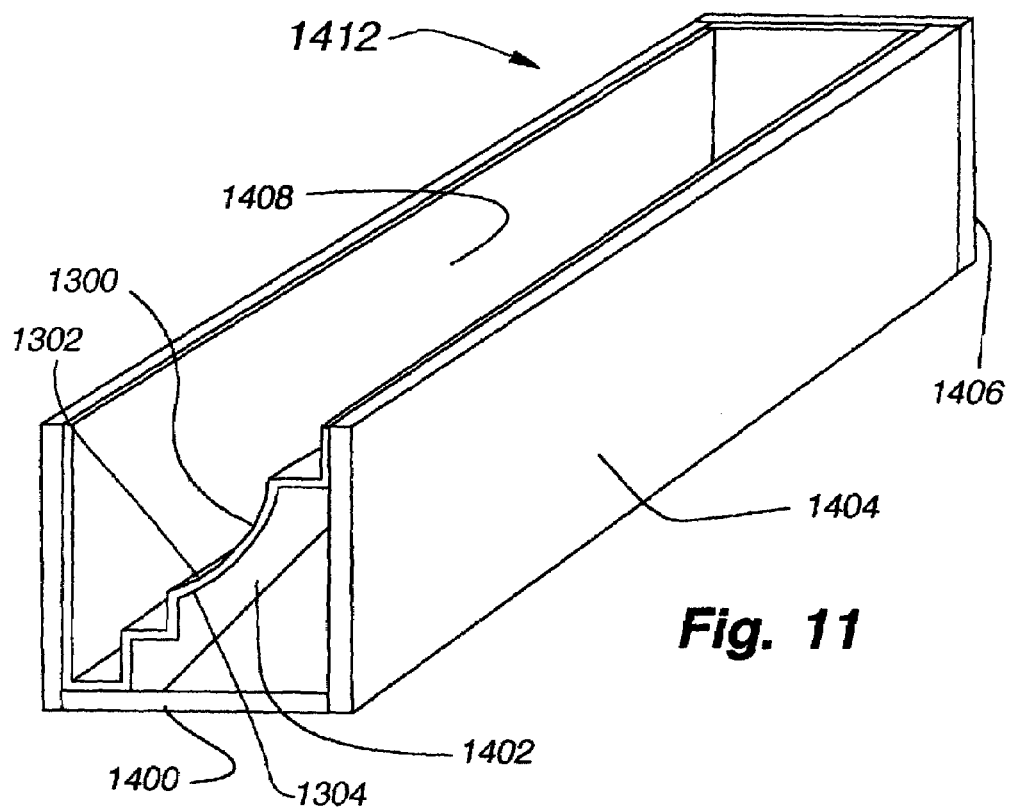
Figure 12:
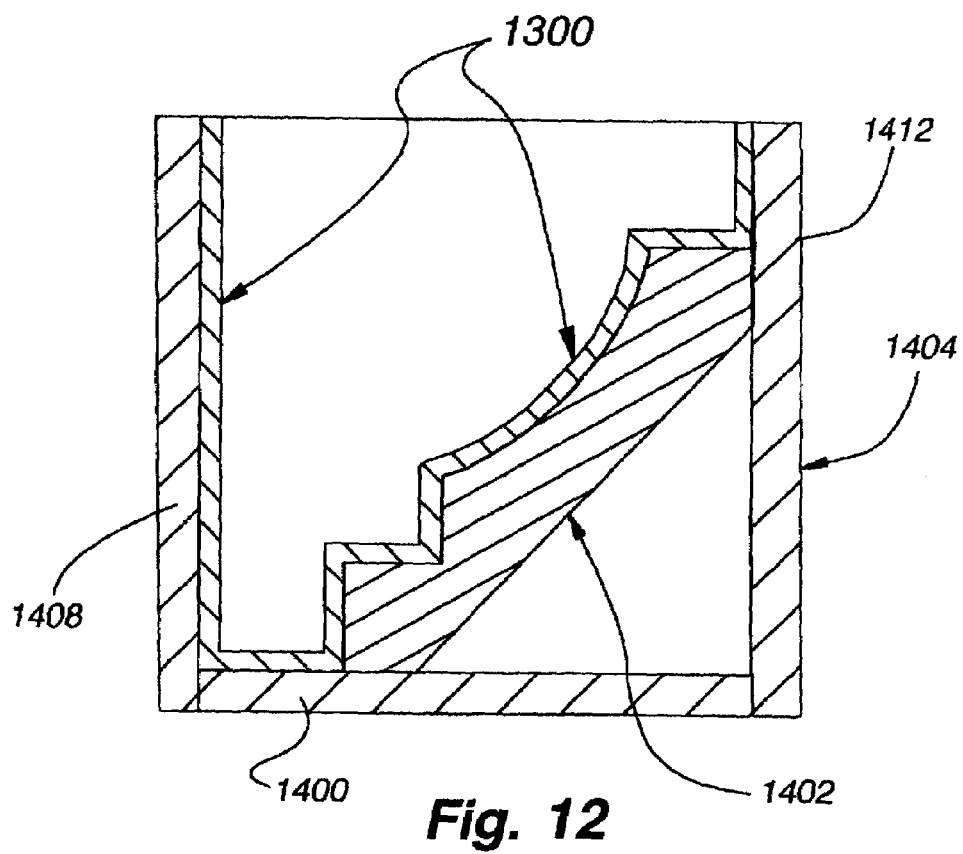

A rigid support structure 1412 is depicted in FIG. 11 comprising a bottom board 1400, side boards 1404 and 1408, end board 1406, and contour board 1402. The contour board 1402 determines the decorative three-dimensional shape of the cast reproduction. In some cases, the three-dimensional shape may be an existing carved shape, such as a sculpted stone piece. The rigid support structure 1412 can be lined with a flexible mold 1410, which can be a portion of the flexible mold 1300 of FIG. 10 trimmed to fit inside support structure 1412. The first flexible mold 1300 has a textured surface 1302 and a smooth surface 1304. The smooth side 1304 of the first flexible mold 1300 faces the inner surfaces of rigid support structure 1412, while the textured side 1302 faces away from the interior of rigid support structure 1412. FIG. 12 in this regard is a side view of the rigid support structure 1412 of FIG. 11.

Figure 13:
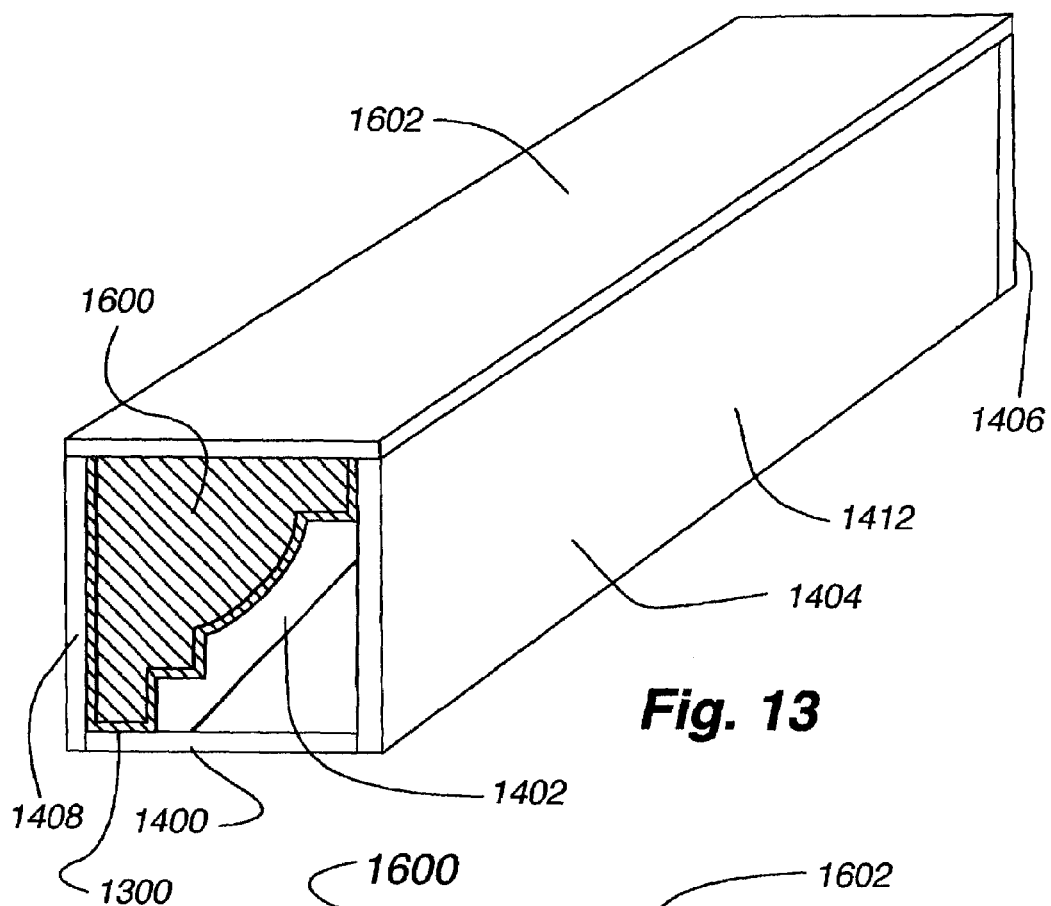
Figure 14:
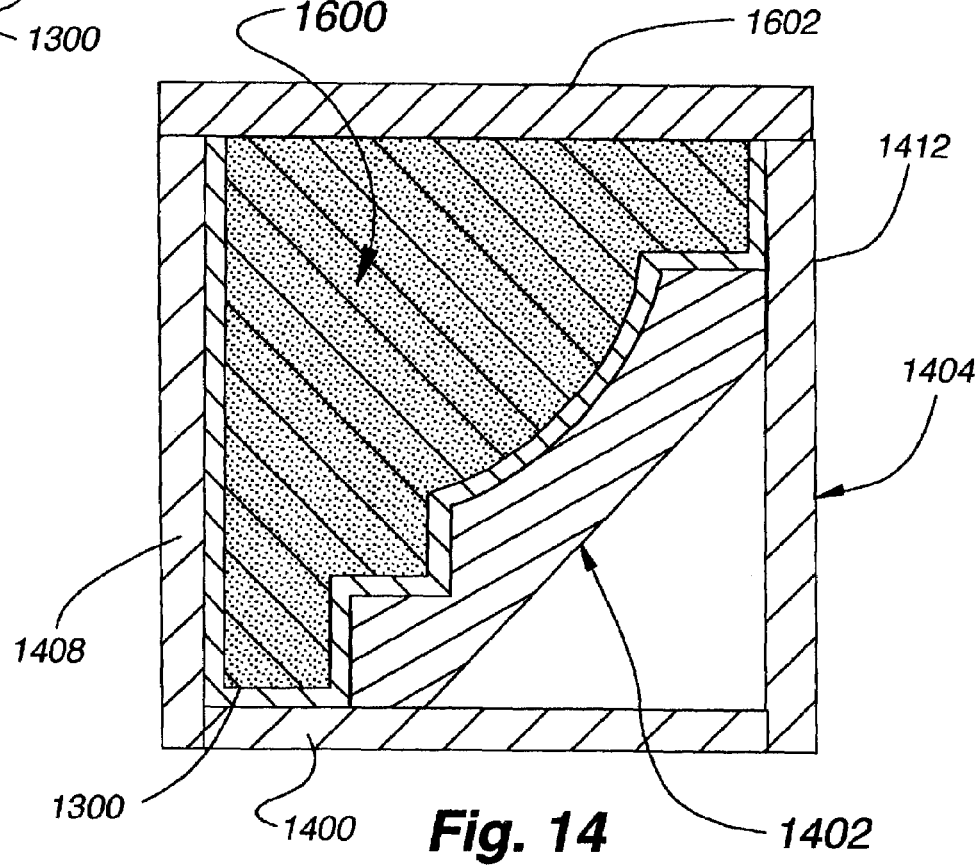

In FIG. 13, the rigid support structure 1412 has been filled with a first castable material such as expandable polyurethane plastic 1600 and the rigid support structure 1412 closed with top 1602. A cross section from the end of the rigid support structure 1412 of FIG. 13 is shown in FIG. 14. The first flexible mold 1300 is thin enough to easily conform under the cure pressures to duplicate the contours of the rigid support structure 1412. The mold 1300 forms a high fidelity veneer on the support structure 1412 adopting the contours of the textured side 1302.

In FIG. 15, top 1602 has been removed from rigid support structure 1412 and the cured polyurethane master reproduction 1800 removed from rigid support structure 1412. The surface of master reproduction 1800 that contacted mold surface 1302 then replicates the surface of stone 1200. A cross section from the end of rigid support structure 1412 of FIG. 15 is shown in FIG. 16.

Figure 17:
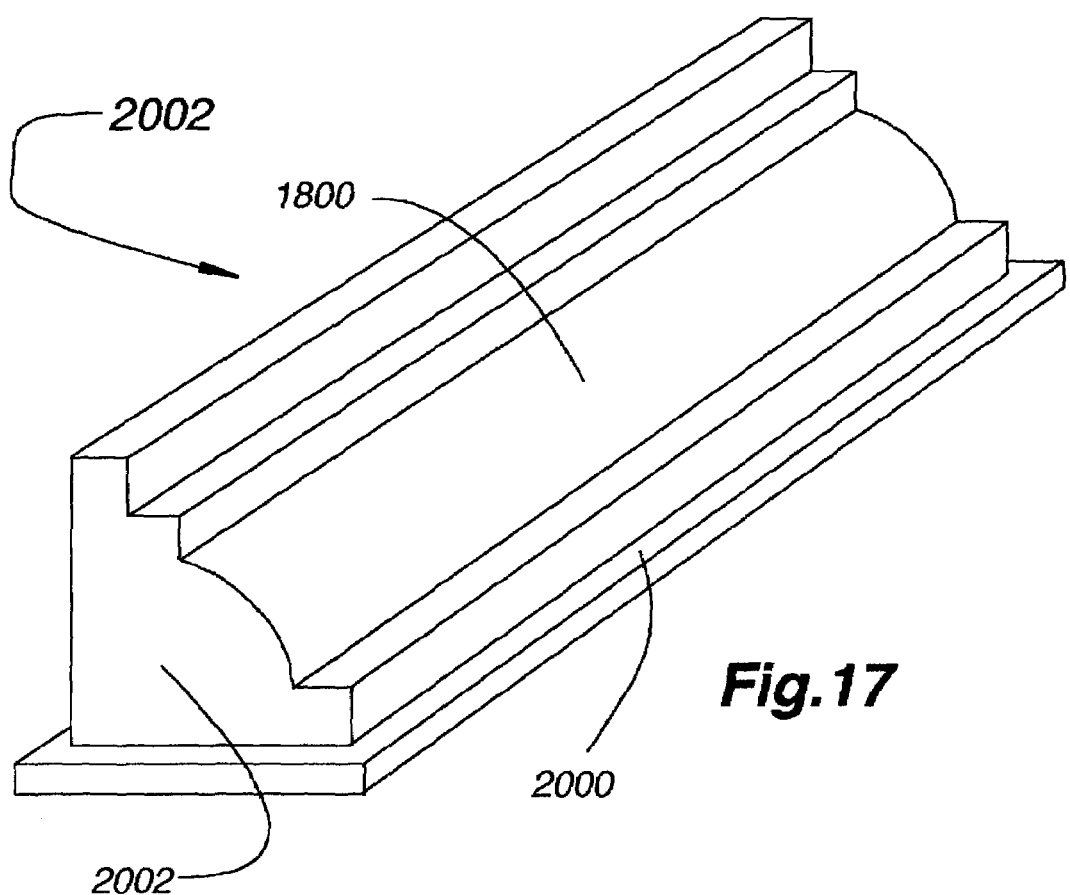
Figure 18:
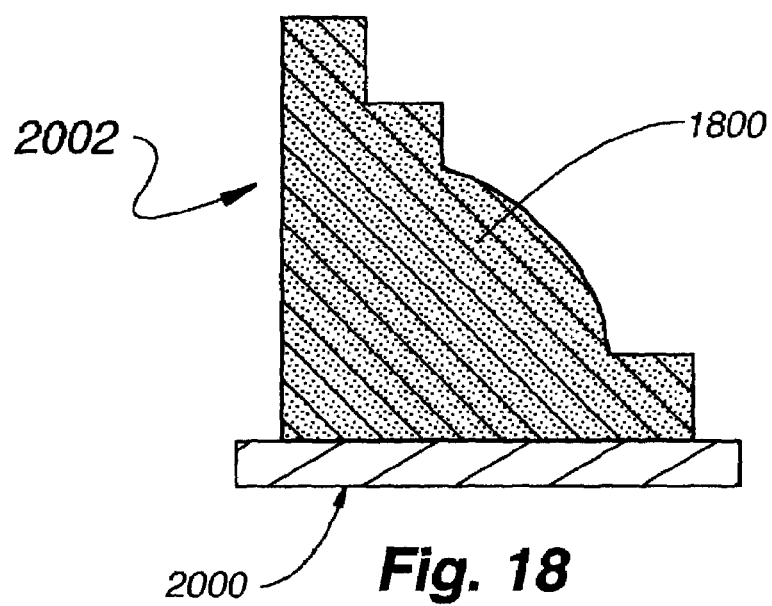

FIG. 17 depicts the master reproduction 1800 after being fully removed from rigid support structure 1412 and placed on top of a board 2000 to form assembly 2002. A cross section of assembly 2002 is shown in FIG. 18.

Figure 19:
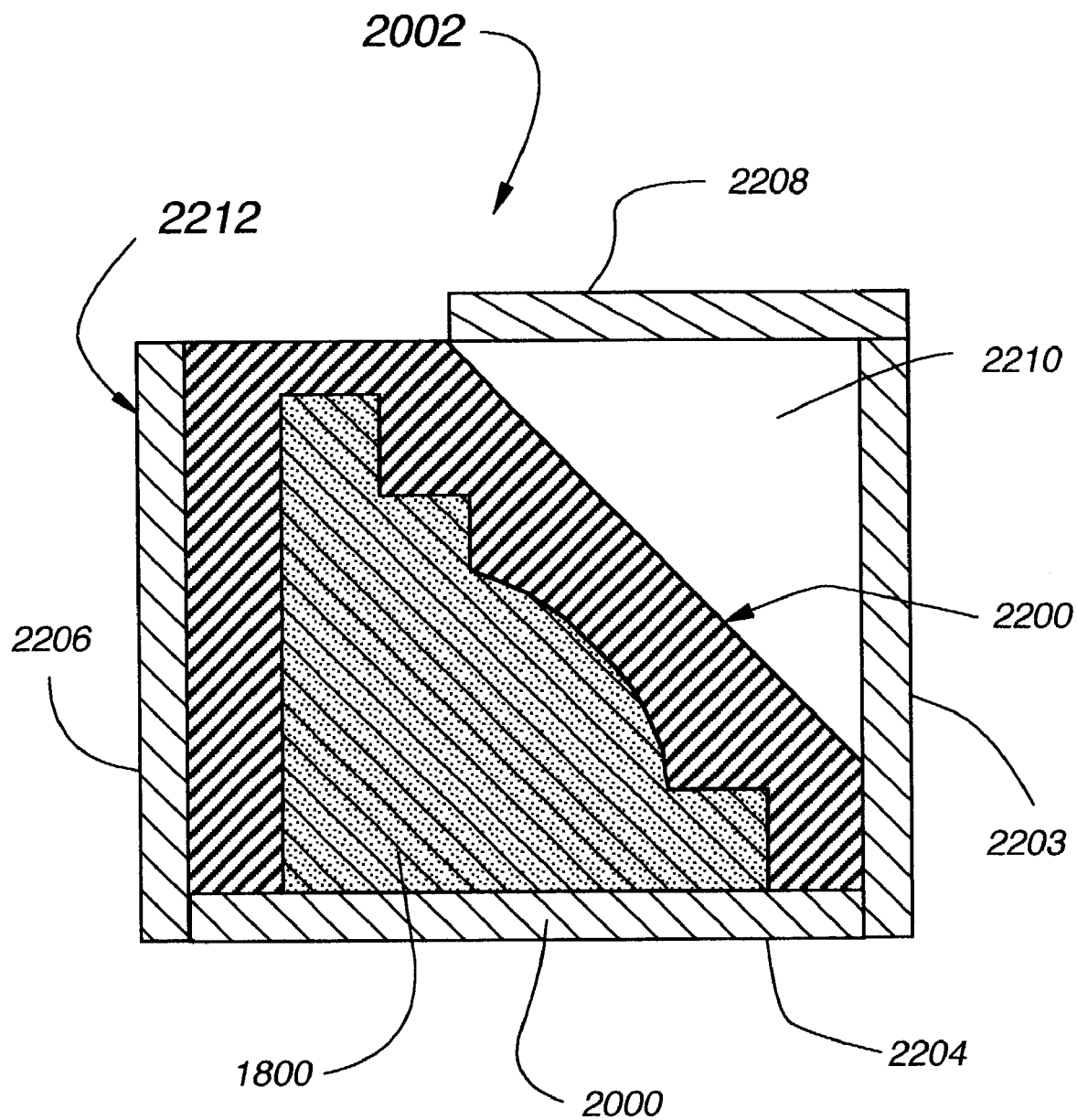

In FIG. 19, assembly 2002 has been combined with a second rigid support structure 2212. Structure 2212 comprises side boards 2203 and 2206, top board 2208, and spacer board 2210. The second rigid support structure 2212 is sized and configured internally so that there is a relatively uniform gap between the master reproduction 1800 and the inner surfaces of second rigid support structure 2212. When uncured silicone is poured into the open top of the second rigid support structure 2212 and allowed to cure, a second flexible mold 2200 of the master reproduction 1800 results.

Figure 20:
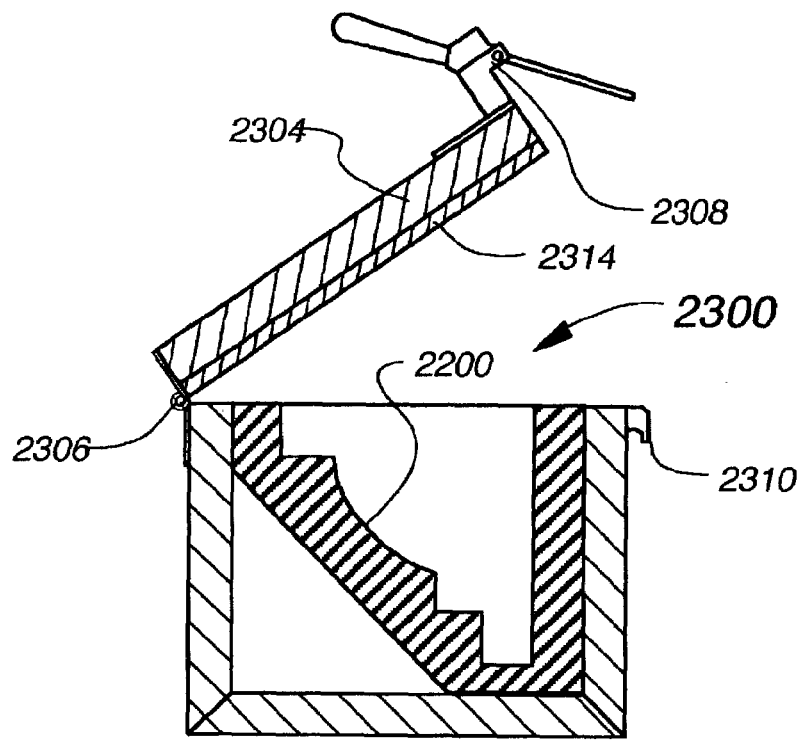

FIG. 20 depicts a third rigid support structure 2300. While the first rigid support structure 1412 and second rigid support structure 2212 may be made of wood, the third rigid support structure 2300 may be made of structural steel or metal as it will be used to create multiple cast articles and thus, needs to be sturdy. Rigid support structure 2300 is sized to receive the silicone mold 2200 as closely as possible. Flexible mold 2200 of FIG. 20 has been placed in closable support structure 2300, which in turn is made up of steel subframes. These subframes are rotatably connected by hinge 2306 with upper subframe or top 2304 being fitted with a sheet of inert plastic 2314.

Figure 21:
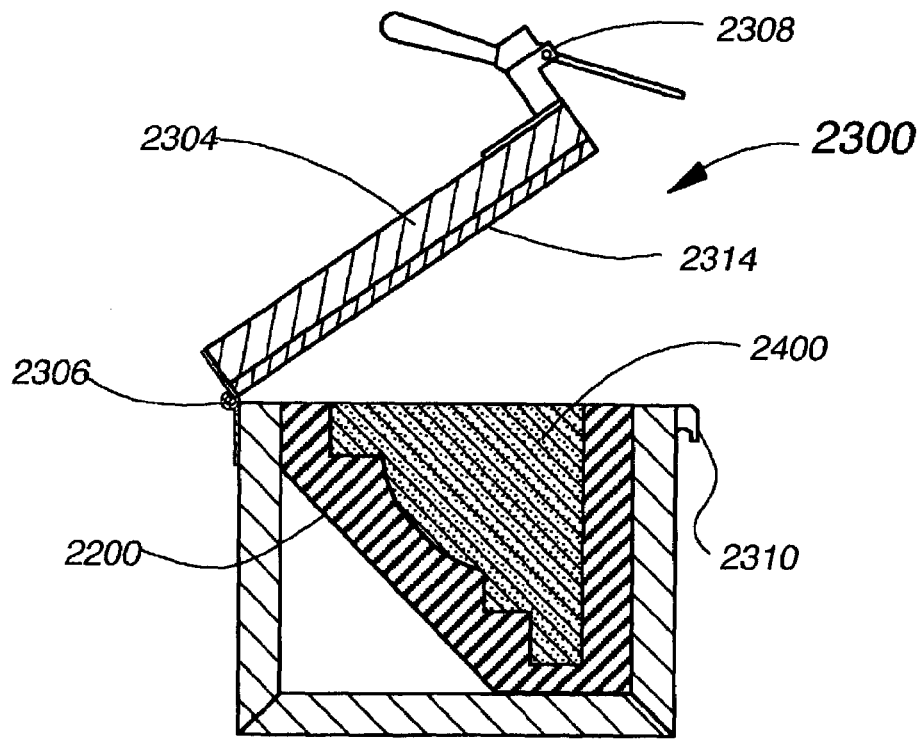

In practice, a second cast article is made by filling the mold 220 in the closable support structure 2300 with uncured polyurethane plastic and rotating top 2304 to cover mold 2200. Latch 2308 is then engaged with bracket 2310 and closed to effect a tight engagement. Inert plastic sheet 2314 prevents the uncured polyurethane plastic from sticking to the top 2304. Once the polyurethane plastic has cured, latch 2308 is disengaged from bracket 2310 and top 2304 is rotated away as shown in FIG. 21. A resulting, cured cast article 2400 of polyurethane such as shown in FIG. 21 is then removed. Polyurethane cast articles made as described above can also be colored by various methods, including those previously discussed.

Figure 22:
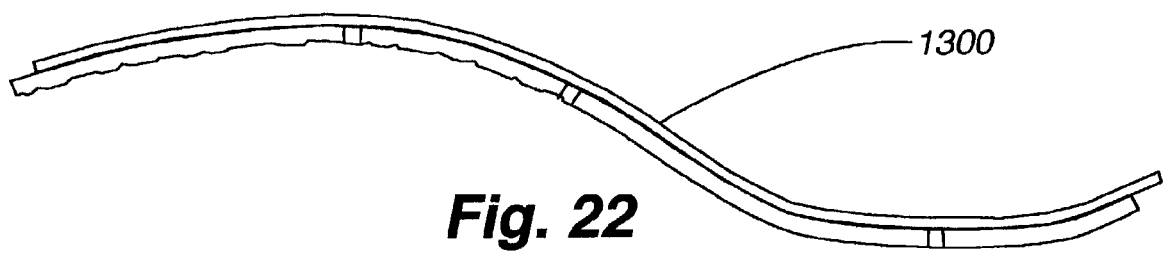

FIG. 22 illustrates a characteristic of the flexible molds like 1300 of FIG. 10 in that they can be manipulated for a particular installation into alternate shapes such as a curved wall, a molding, a support beam, or other architectural detail. In such cases, the final cast article of the processes of the present invention will have the desired texture on the outside surface replicating the surface texture of the original object (e.g., stone panel). Such a result from real stone would require a very skilled stone mason to work onsite many hours to shape each stone element to fit together and to curve uniformly. In the case of moldings or carved stone replicas, a sculptor would have to sculpt the stone, after finding the appropriate stone block. In the processes of the present invention, the selected texture is replicated on an easily constructed surface made from easily machined materials, such as wood or plastic. The final cast article in this regard is a unique benefit of the disclosed process.

Figure 23:
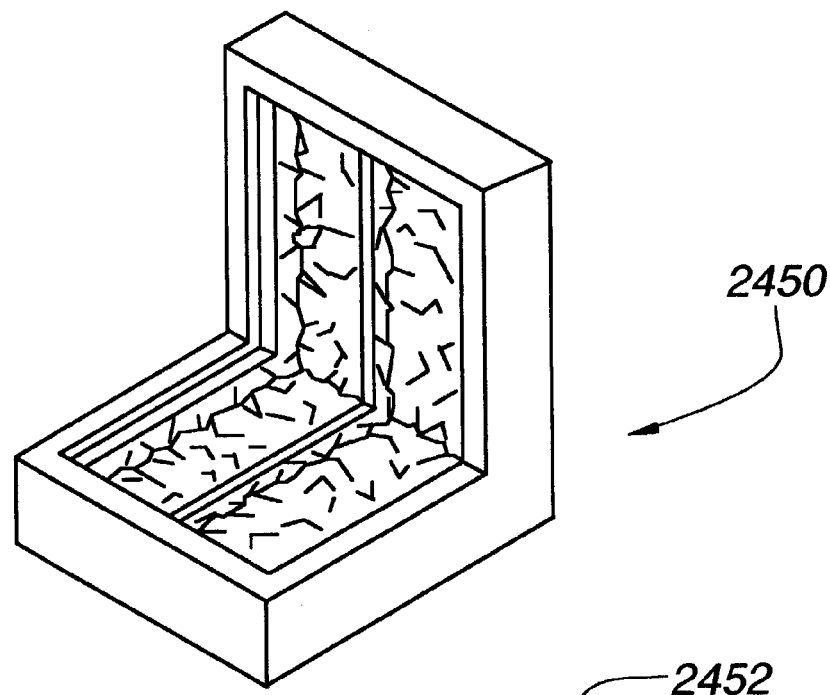
Figure 24:
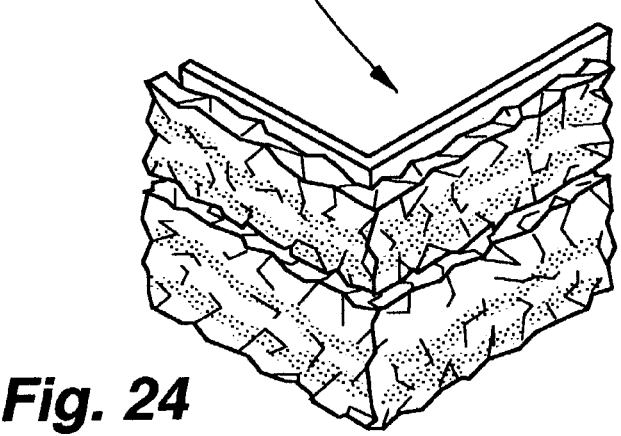

FIG. 23 illustrates a second flexible mold 2450 to produce a second master reproduction such as the corner piece 2452 shown in FIG. 24. The corner piece 2452 is formed as a single piece and thus, does not have the joint of two, separate wall pieces.

Figure 25:
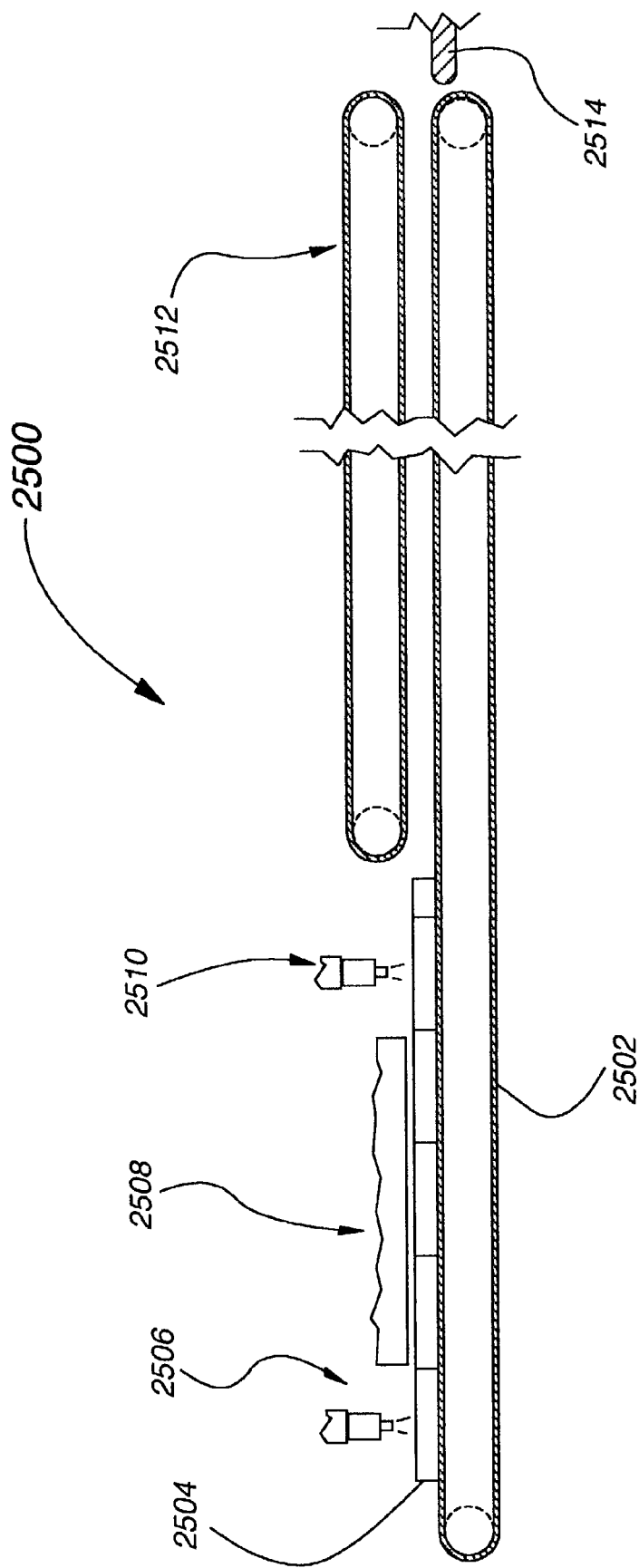
FIG. 25 depicts a system for the production of cast articles with first and second conveyors moving in combination.

FIG. 25 depicts a system 2500 for the continuous production of polyurethane cast articles. First lower conveyor 2502 is loaded continuously with molds 2504, which are made from one or more original objects or master reproductions thereof. Once a mold 2504 is placed on lower conveyor 2502, one or more coloring dispensers 2506 introduce one or more coloring agents, powdered or liquid, as well as wetting agents, such as water or alcohol where required, into the cavities in the mold 2504 so as to color the cast articles produced from molds 2504 by various methods, including the methods described above. Lower conveyor 2502 then conveys molds 2504 to one or more heaters 2508, which dries all coloring agents, paints and water in molds 2504, and also heats the mold 2504.

Lower conveyor 2502 then conveys molds 2504 to a second castable material dispenser 2510, which fills molds 2504 with a castable polyurethane. Next, lower conveyor 2502 conveys molds 2504 under second upper conveyor 2512, which inhibits the castable urethane from foaming beyond the confines of molds 2504. The conveyor 2512 preferably has a surface of inert material so the castable material will not stick to the conveyor 2512. Depending on the formulation of the castable material, this second conveyor 2512 may need to apply pressure to the mold during the cure. Finally, lower conveyor 2502 conveys molds 2504 beyond the second or upper conveyor 2512 and onto receiving platform 2514, where the cured cast articles are removed from molds 2504.

Figure 26:
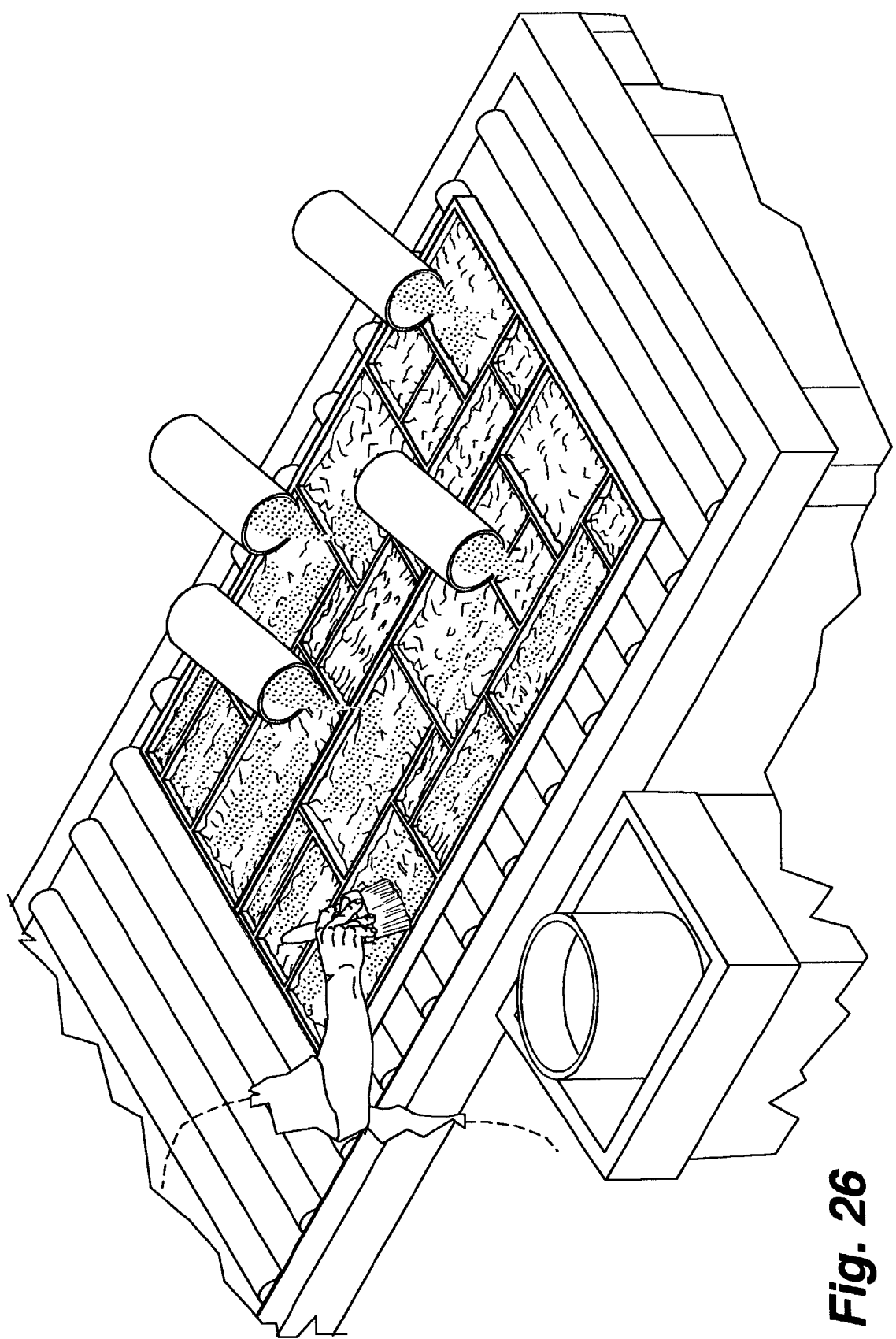
FIG. 26 illustrates the preparation of a mold including pouring coloring and UV protection additives in the mold and treating it with solvent or wetting agents, such as denatured alcohol.
Figure 27:
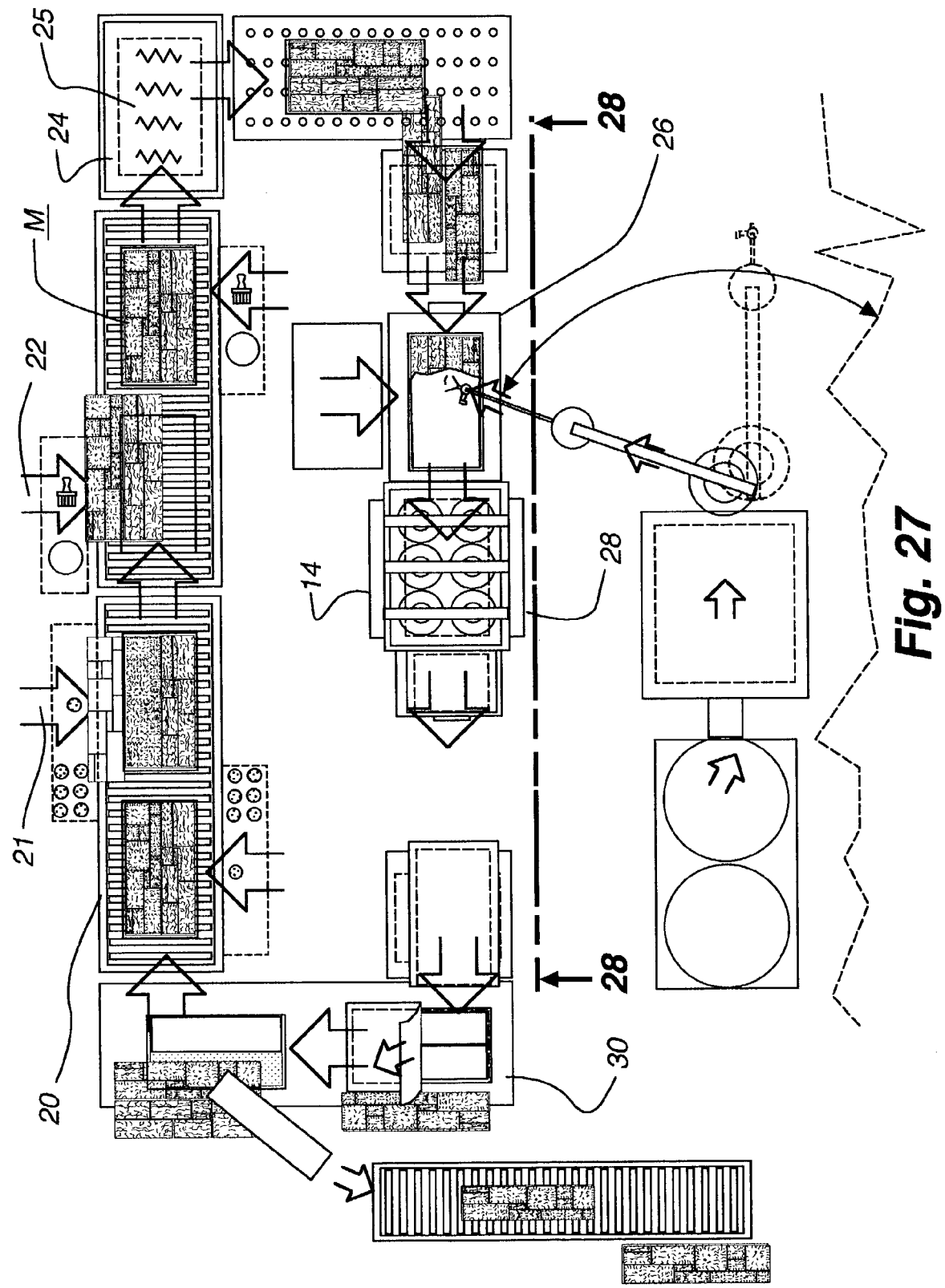
FIG. 27 depicts another system for the production of cast articles.

Another embodiment of the production process and a cure apparatus is illustrated in FIGS. 26 and 27. FIG. 26 illustrates the mold preparations with coloring agents placed in the cavities. The brush spreads the agents and wets them with a wetting agent, such as denatured alcohol or water. The wetting agent must not cause the mold to swell as this will degrade control and quality of the accuracy of the replicas of the stone surface texture. The activities of FIG. 26 occur in FIG. 27 in areas 20, 21 and 22. Area 24 is a drying area to dry the incoming mold M of any wetting agent before the polyurethane fills the mold M. In FIG. 27 a flash heater 25 is illustrated to quickly dry the mold. In area 26 the dry, prepped molds are filled with polyurethane.

Figure 28:
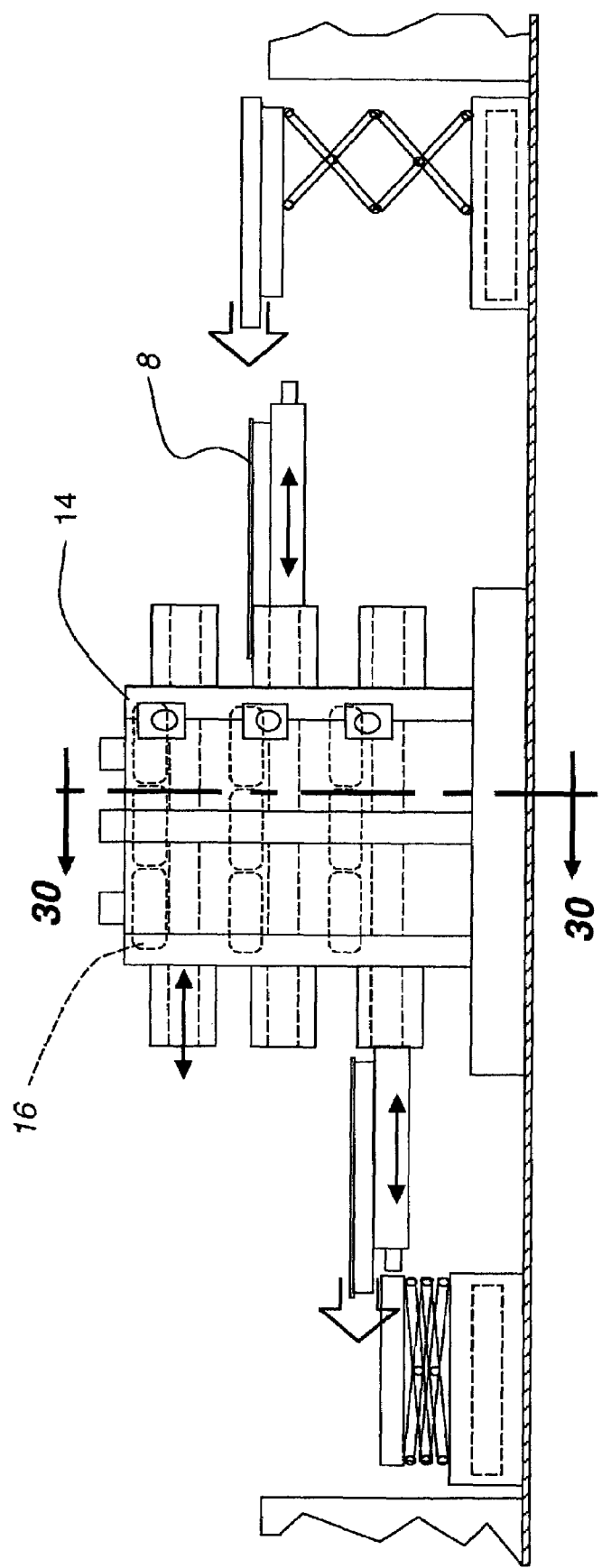
FIG. 28 illustrates the cure apparatus of one embodiment to enable an efficient use of space by stacking the filled molds for curing.

FIG. 28 depicts a stack 14 of closable support structures. It can be a multi-layered structure with bottom or layers to support each mold. In this embodiment each layer operates by pneumatic, mechanical or hydraulic forces to cause a top or platen to come down onto the mold form with side supports for the cure of the polyurethane to inhibit the expansion and increase the density and thus the fidelity of the reproduction. A plastic sheet or inert sheet is inserted between the top and the filled mold before the top is lowered, thus preventing the polyurethane adherence to the top. Thus, each layer forms a closable support structure.

The expandable polyurethane creates pressure during expansion with the top, bottom, and side supports containing the pressure thus controlling the density of the second cast reproduction. The cured density ranges from 5 lbs. per cubic feet to 25 lbs. per cubic feet. As is well known in the art, if the castable material has a large expansion the material will generate more pressure and thus, more resistant pressure is required to accomplish the cure density desired. Thus, closable support structure may have a means to resist the required pressure during the cure.

FIG. 28, is a side view of the rack shelves being loaded from station 26. After a particular mold is cured, it is removed to station 30.

Figure 29:
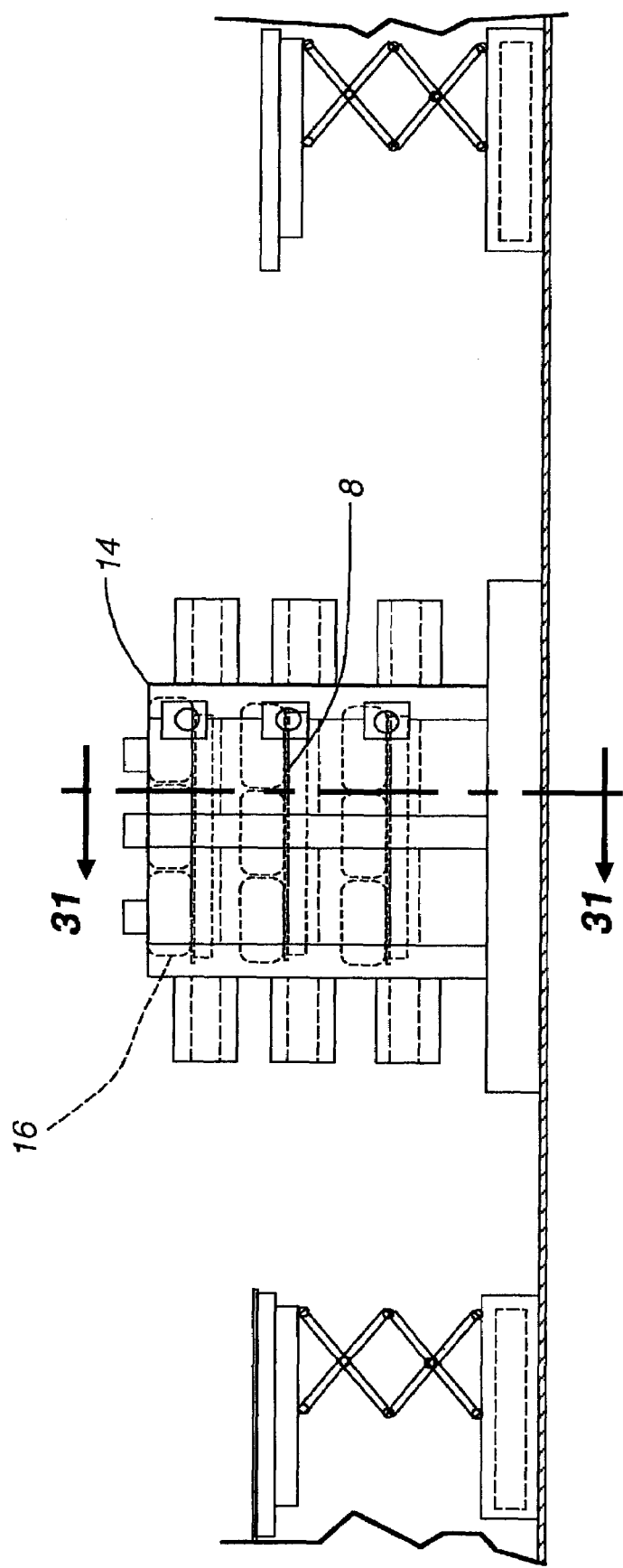
FIG. 29 illustrates the closable support structure with a covering top to keep pressure on the molds during the cure time.

FIG. 29 illustrates the press 14 with the pneumatic mechanism 16 expanded to close the top onto the mold during the cure.

Figure 30:
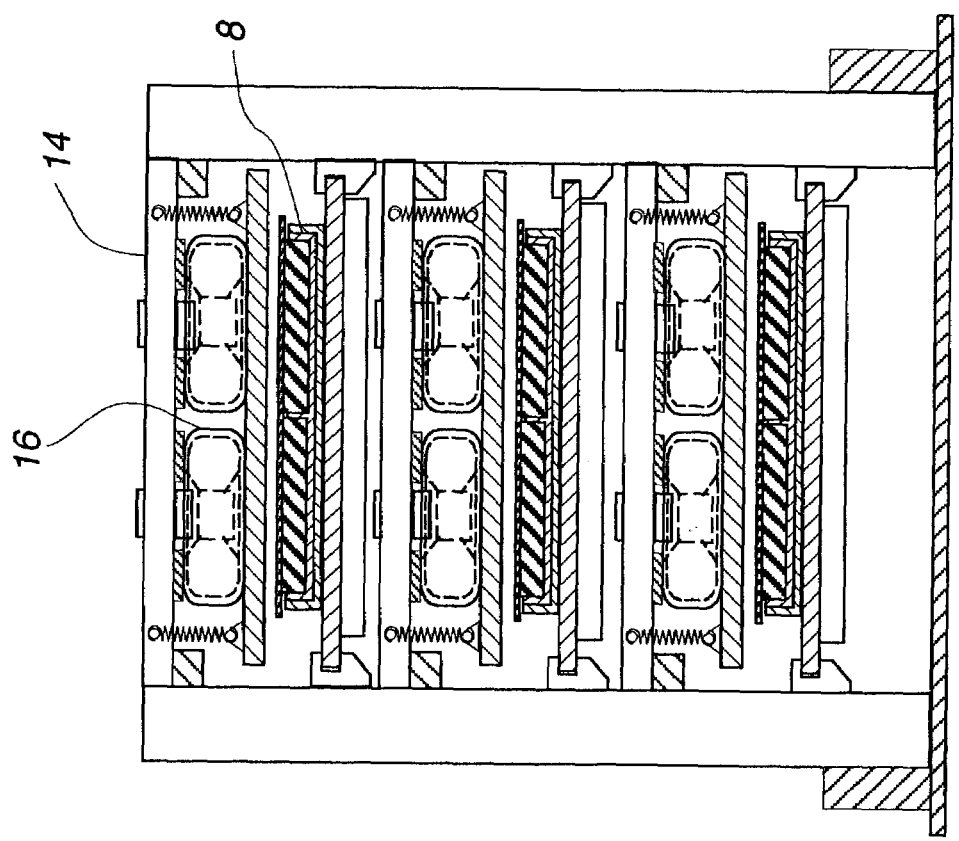
FIG. 30 illustrates the closable support structure in a non-pressurized state.

FIGS. 29 and 30 show the press 14 with FIG. 14 showing the deflated pneumatic mechanism 16.

Figure 31:
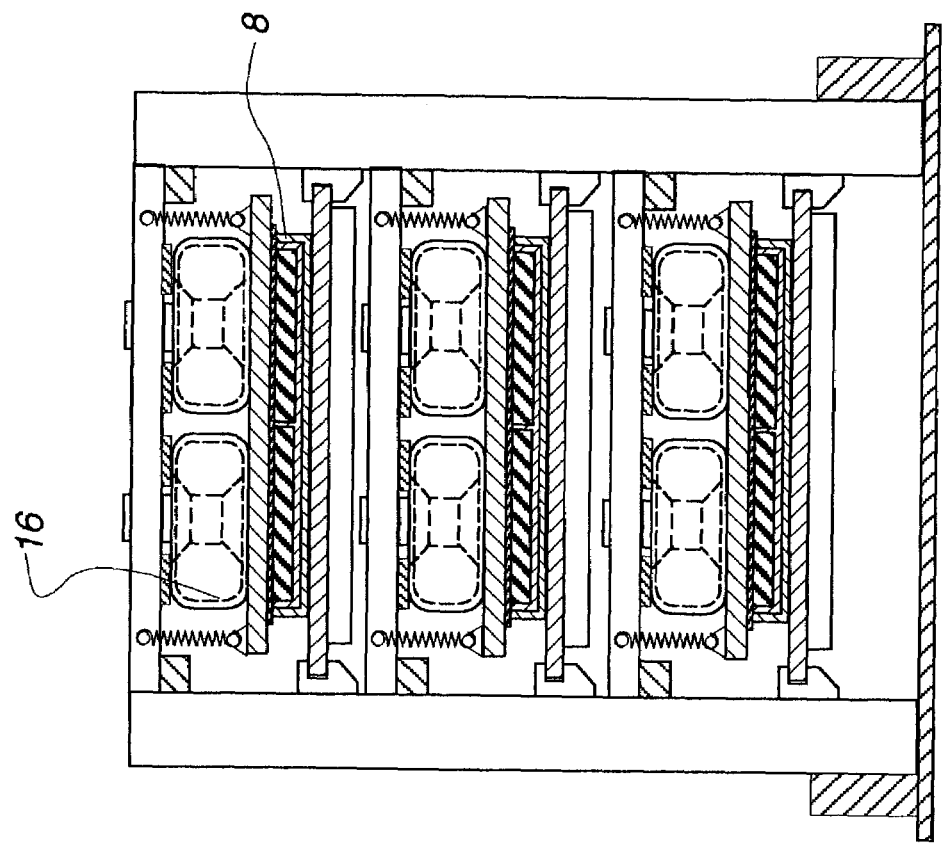
FIG. 31 illustrates the closable support structure in a pressurized state.

FIG. 31 shows the pneumatic mechanism 16 inflated and thus, closing the top onto the mold 8.

Figure 32:
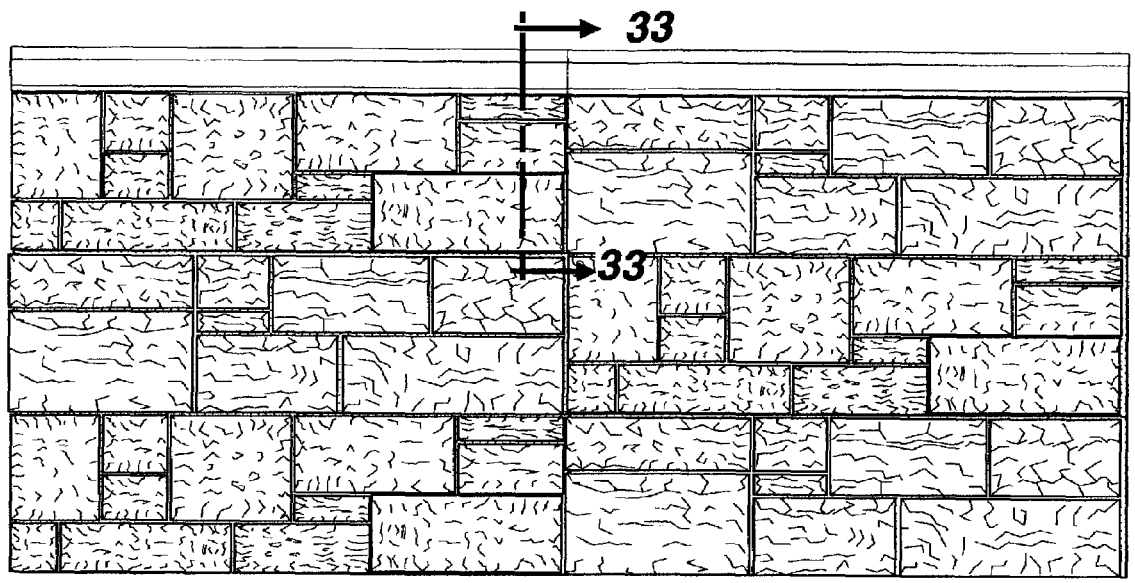
FIG. 32 illustrates a wall formed with multiple panels.
Figure 33:
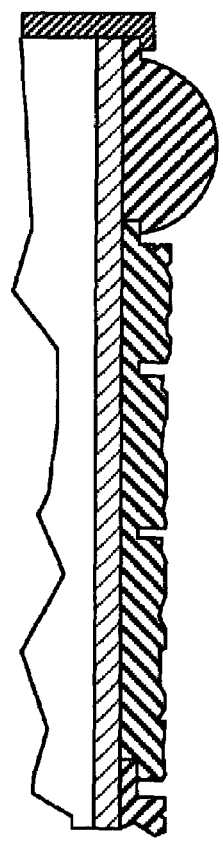
FIG. 33 is a side view taken along line 33-33 of FIG. 32 illustrating the joining of various elements of the wall.

The FIGS. 3, 7, 18, 24, 32, 33 and 34 illustrates the manufactured articles in various shapes. The FIG. 32 illustrates the facade that may be used to give the appearance of a true stone wall.

The previous machine apparatus for continuous molding, by using a conveyor, works well for large sheets. For smaller sheets, or reproduction of odd shapes or composite shapes, the alternate methods described and apparatus works very well.

In another embodiment of the apparatus, "low-rise" foam or non-expandable castable material is used. A type of low-rise polyurethane from Urethane Technologies Corp., Part No. UTC-6036-15c, is preferred. Alternatively, castable material that does not expand can be used as illustrated herein. By using a low-rise, or non-expandable, castable material there are advantages in that the closable support structure may be merely a top placed over the mold.

The described low-rise castable material, with a density of approximately 15 pounds per cubic foot, or non-expansive castable material with good cast capability at low containment pressure allows for a less rigid closable support structure. If side and bottom support is desired, the closable support structure may be of material, such as cardboard, composites, wood, plastic or other similar material.

In this embodiment, the only pressure applied to the mold is due to closing the top onto the mold that is filled or that beomes filled by the low-rise expansion. The method allows the cast article to be of more complex shapes. These shapes may include rounded, sculpted, or multi-faceted, shapes. If used with medium to high pressure, a closable support structure for such shapes necessitates restricting the pressures in all directions. Such pressure containment is a complex requirement, making the apparatus very expensive and the process difficult. With low or no-rise castable material only a very small resistance to the expansion pressures, in the case of expansible castable material, or the pressure of closing the top on non-expansible castable material is necessary. Only enough pressure to make sure the castable material fills the voids in the mold is needed.

The apparatus to accomplish the method and the steps of the method using low or no-rise castable material are illustrated by FIGS. 34 thru 47. The method and apparatus of the previous embodiments are the same up to the casting of the cast article wherein the following methods and apparatus may be used. In some circumstances the casting of the master reproduction may use the following procedures if the castable material for the master reproduction is of a low-rise or norise type.

Figure 34:
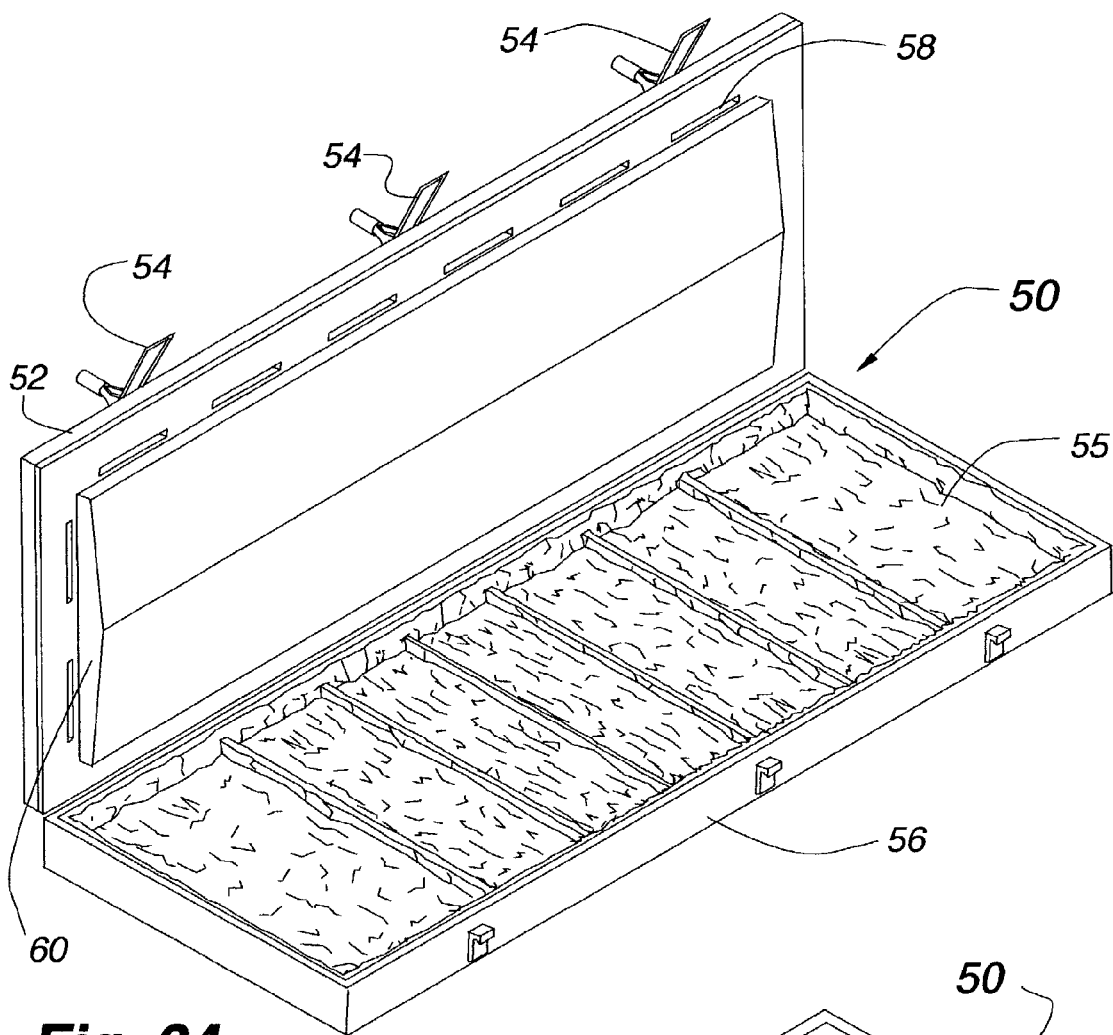
FIG. 34 illustrates the closable support structure in an open position with a mold in it.
Figure 35:
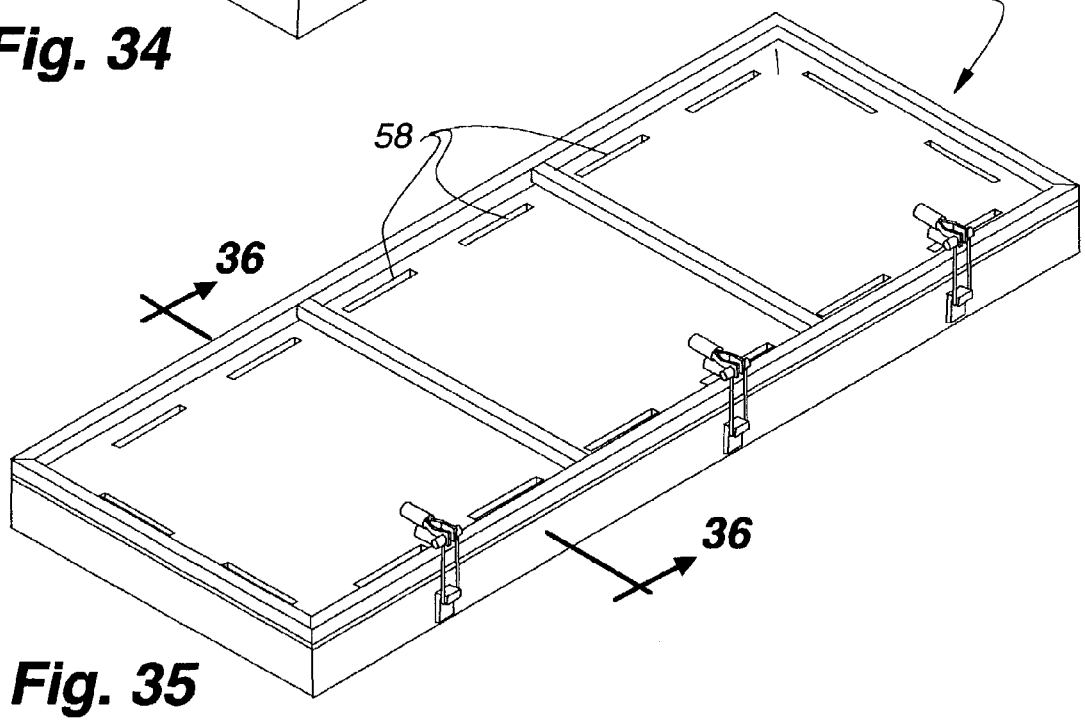
FIG. 35 illustrates the closable support structure with the top in a closed position.

FIG. 34 illustrates a closable structure 50 with a top 52, sides 56, latches 54, vents 58 and a protrusion area 60 in the top that extends into the mold cavity with the top closed as illustrated in FIG. 35.

Figure 36:
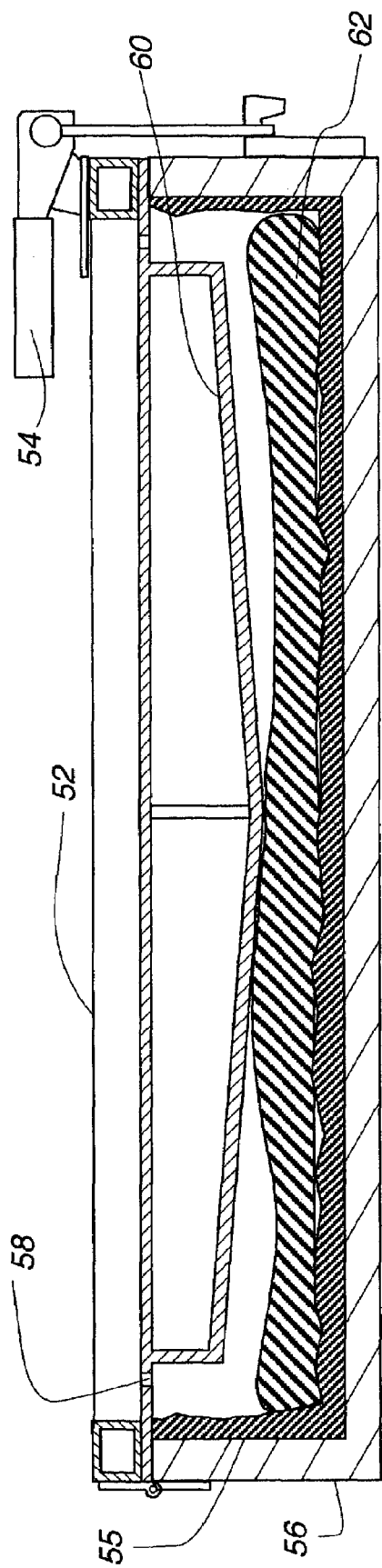
FIG. 36 illustrates a view taken along line 36-36 of FIG. 35 showing the top with a protrusion into the mold cavity and into the castable material in the mold.
Figure 37:
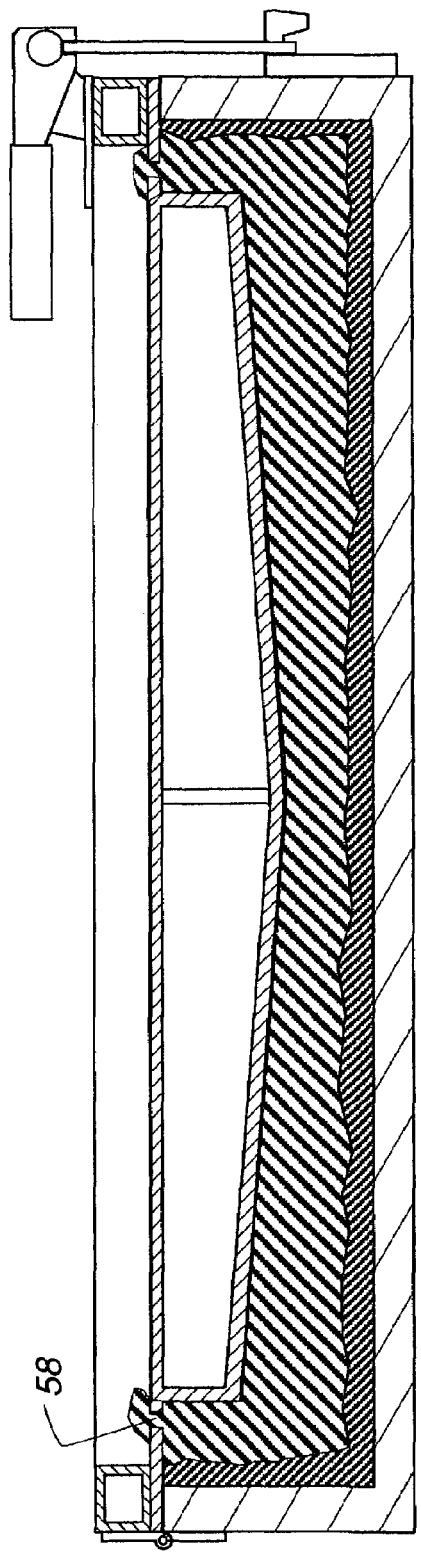
FIG. 37 illustrates the same view as FIG. 36, but after the castable material has expanded and excess castable material has exited the vents in the top.
Figure 38:
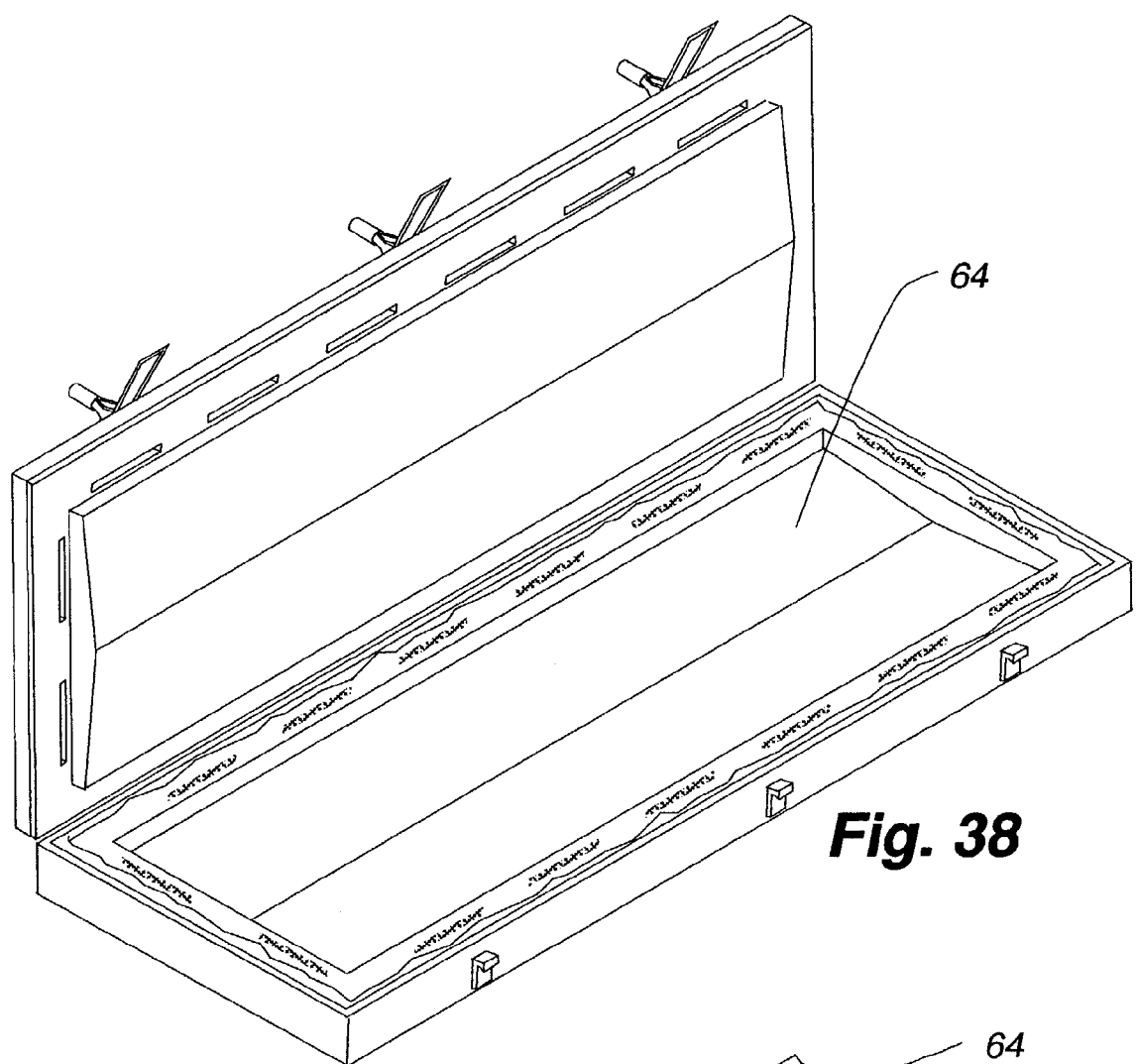
FIG. 38 illustrates the closable support structure after the casting material is cured showing the excess castable material that exited the vents and showing the hollowed-out portion of the cast article caused by the protrusion of the top.
Figure 39:
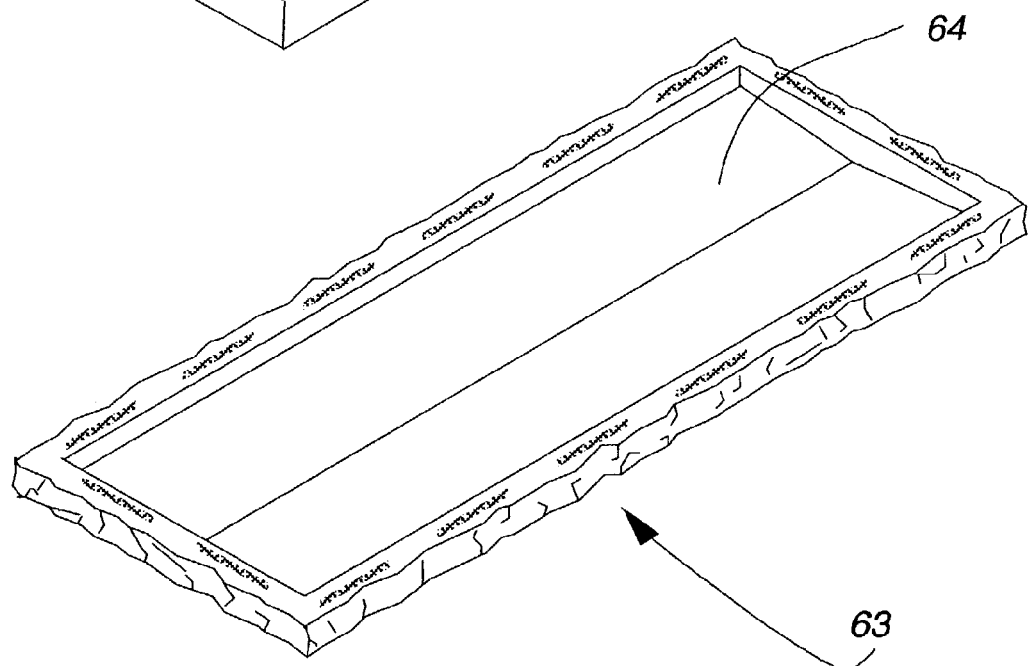
FIG. 39 illustrates the cast article.
Figure 40:
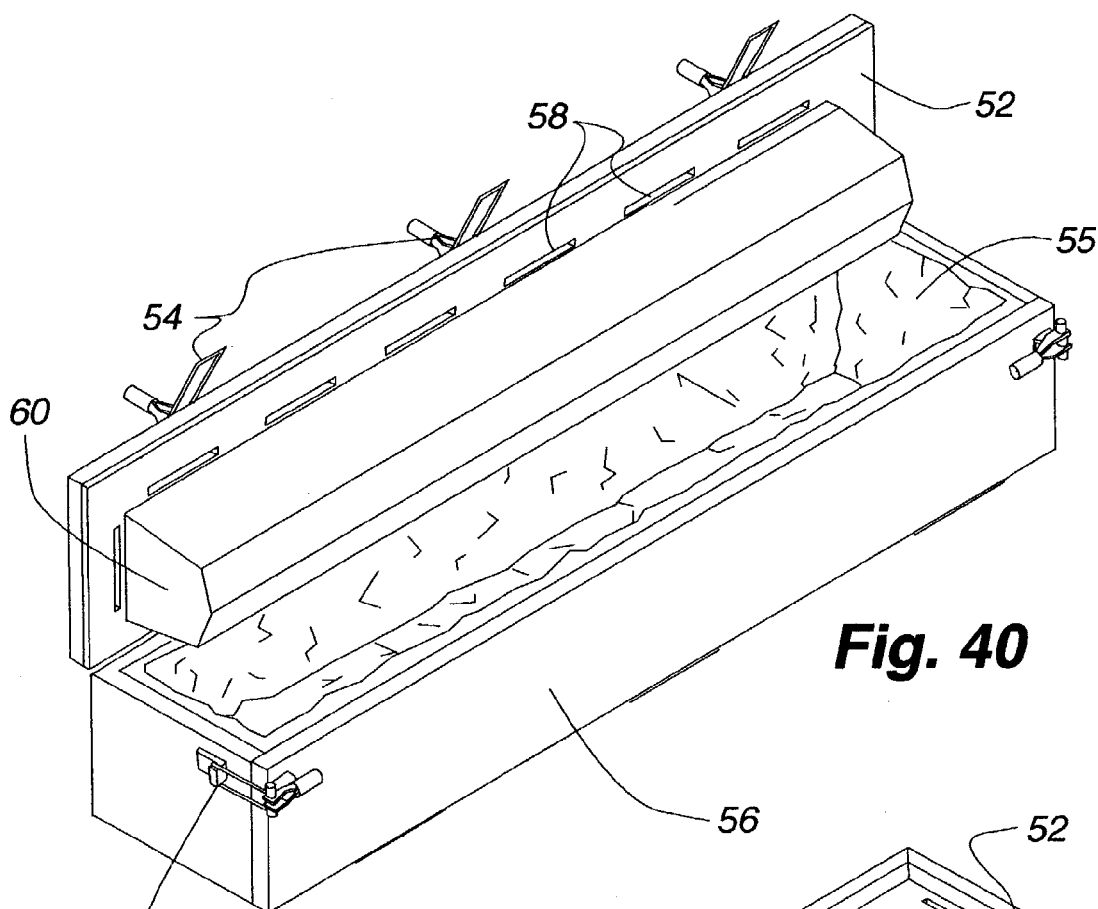
FIG. 40 illustrates another closable support structure and a second mold before any castable material is placed in the mold.
Figure 41:
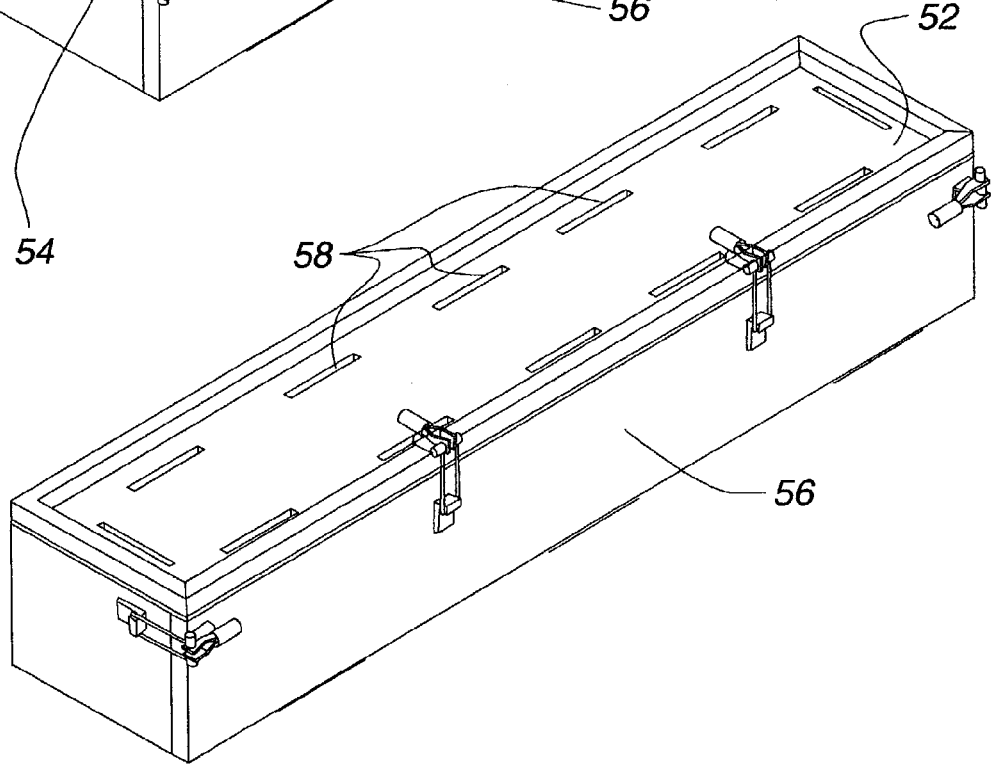
FIG. 41 illustrates the closable support structure with the top closed.
Figure 42:
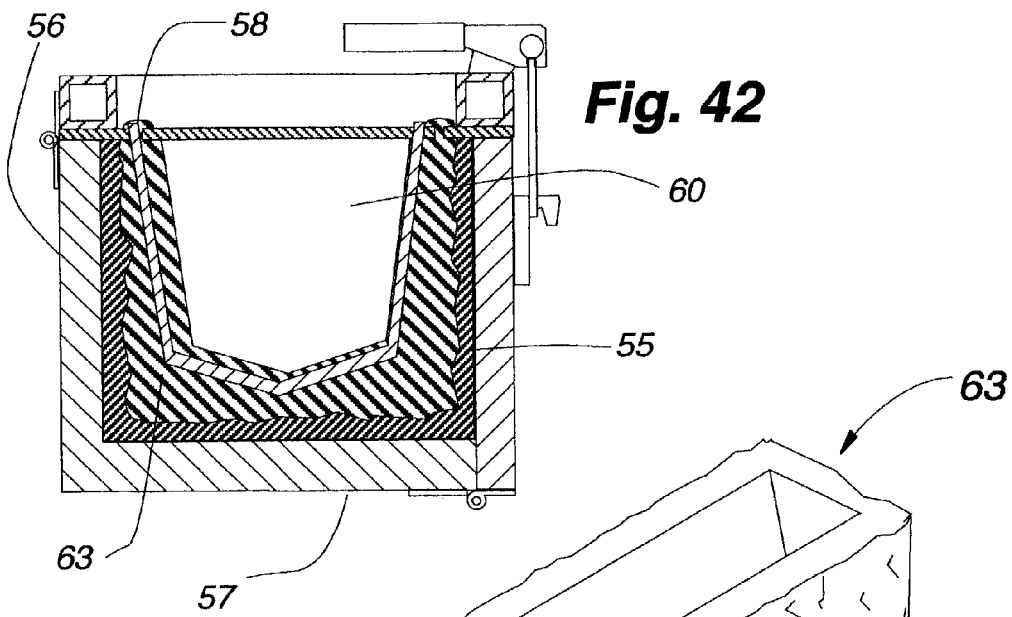
FIG. 42 illustrates a side view taken along line 42-42 of FIG. 41 showing the closable support structure, the second mold, the castable material, and the vents where excess castable material has exited.

FIGS. 36 and 37, illustrate a side view from line 36-36 in FIG. 35. The mold 55 is supported by sides 56 and bottom 57. The top 52 is held on top of the mold by latch 54. The castable material 62, such as the low-rise expansible polyurethane is placed in the mold cavity before the top is closed. The protrusion area 60 extends into the mold cavity.

In FIG. 37, the castable material during expansion fills the mold cavity and exits the vents 58 after filling the mold cavity. In use of castable material that does not expand, the mold cavity is filled so that upon closure of the top 52 there is enough extra castable material to be forced to exit by way of the vents 58, thus insuring that all voids in the mold have been filled. The protrusion area 60 keeps the castable material 62 from filling this area, thus creating a hollow area 64 in the cast article 63 illustrated in FIGS. 38 and 39. The hollow area 64 is used to save on material, to lessen the weight of the cast article 63 and may be used as a means of mounting the cast article. An inert layer can also be applied between the top and the castable material if adhesion is a problem.

Figure 43:
FIG. 43 illustrates the cast article.

The advantage of a hollow 64 is greater if the cast article 63 has a large volume. FIGS. 40-44 illustrate an example. The cast article 63 is illustrated in FIG. 43 after it is removed from the mold showing the hollow 64 formed by the protrusion area 60 of FIG. 42. Again, if the castable material does not expand, the fill of the mold is to the level that forces the excess castable material to exit the vents 58.

Figure 44:
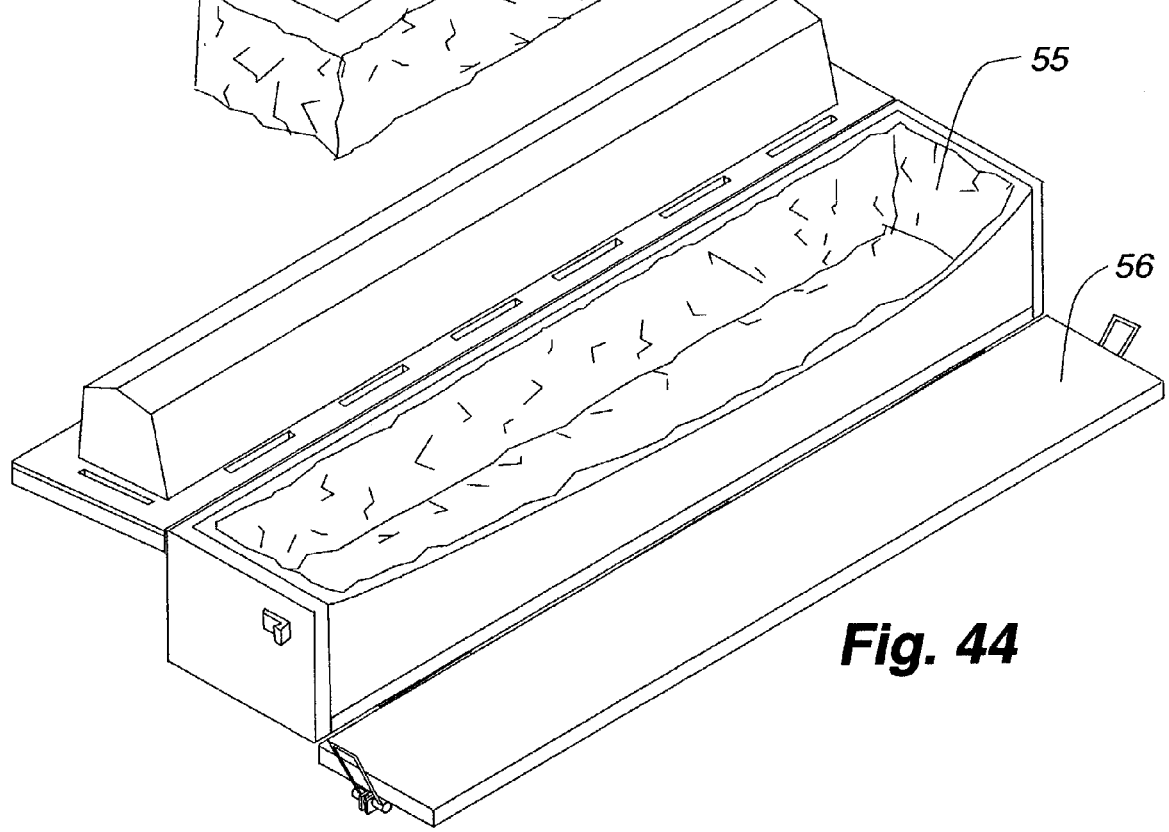
FIG. 44 illustrates the closable support structure with the top opened and the side support opened to allow for the removal of the cast article and second mold after casting.
Figure 45:
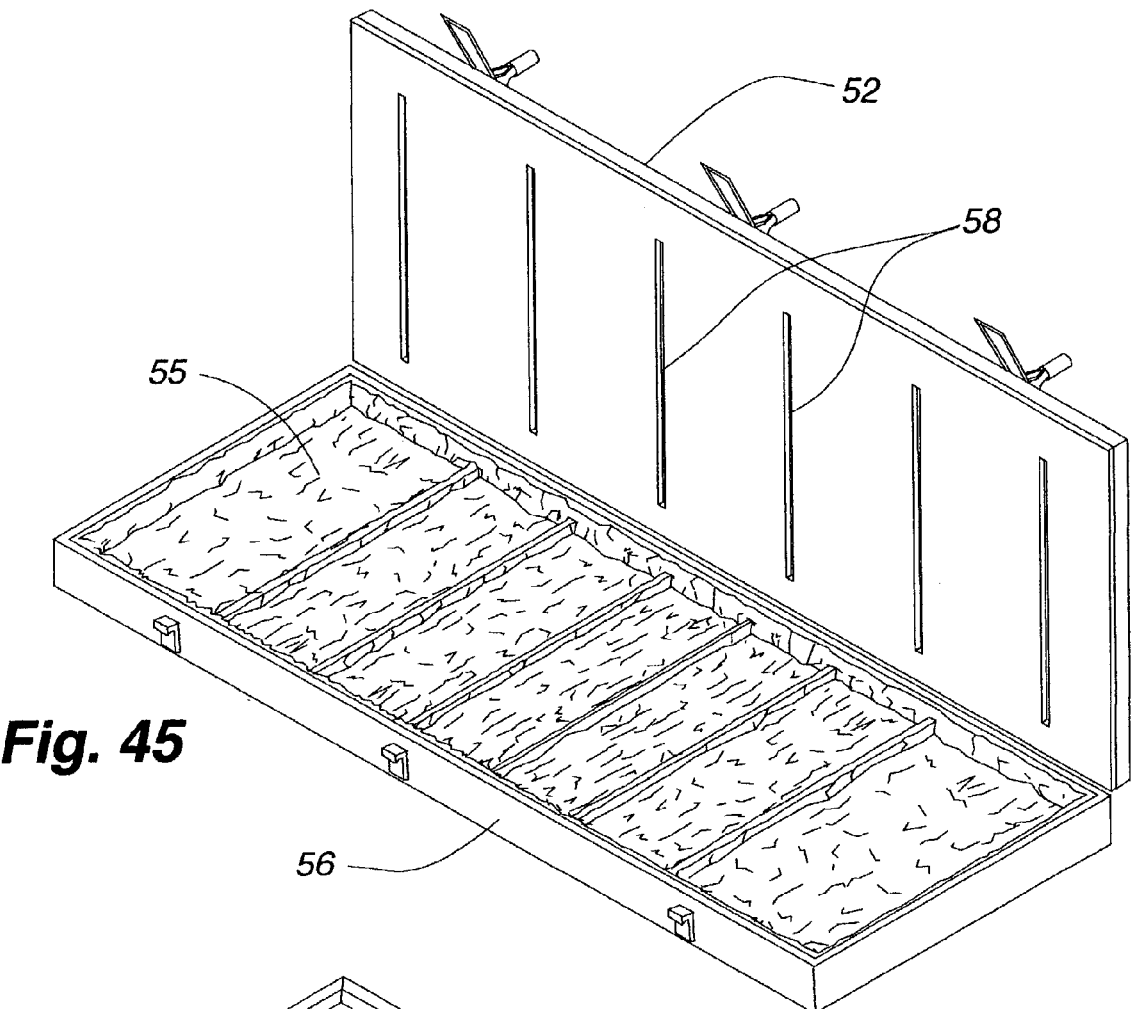
FIG. 45 illustrates an alternate top for the closable support structure showing vents along the top but without the protrusion into the mold cavity of FIG. 36.
Figure 46:
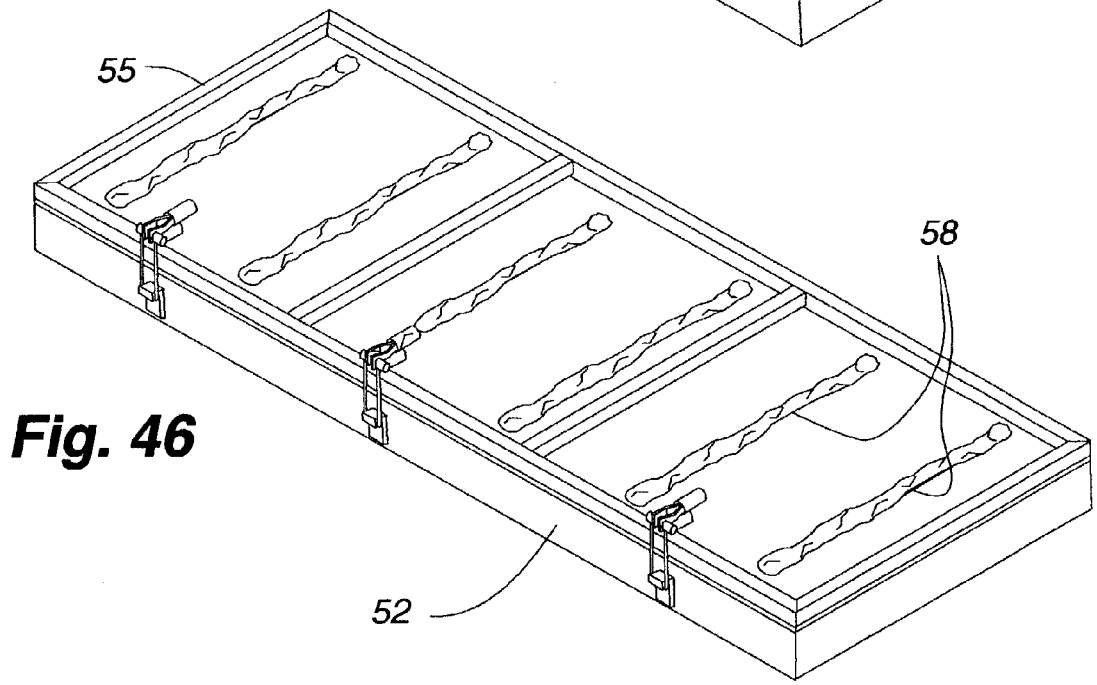
FIG. 46 illustrates the top of FIG. 45 closed over the mold.
Figure 47:
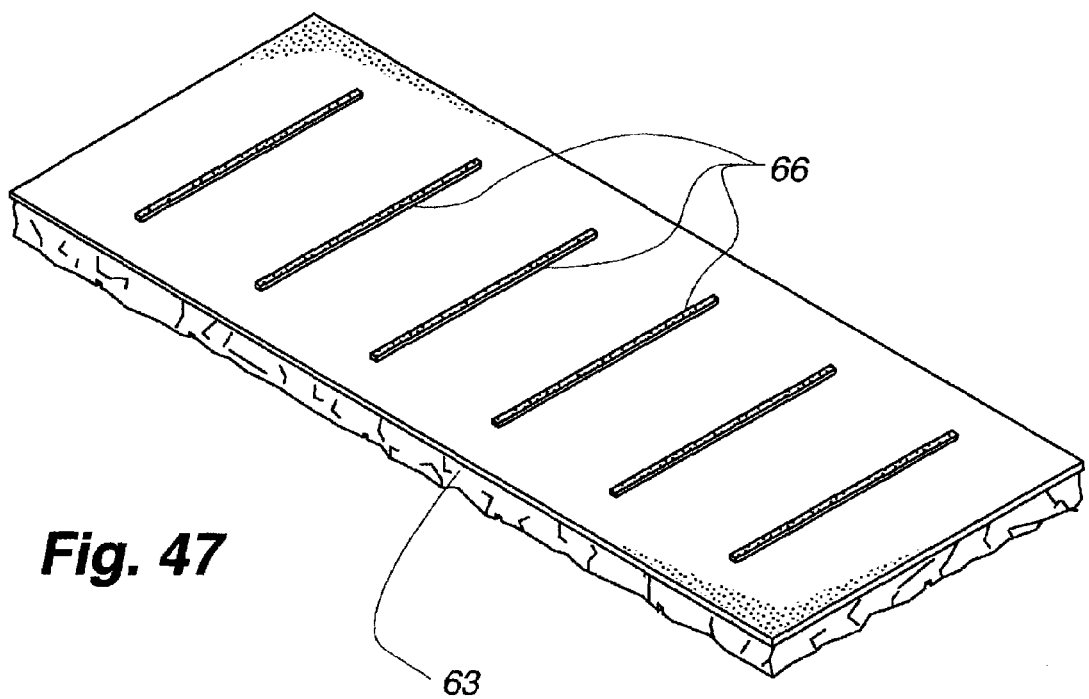
FIG. 47 illustrates the cast article removed from the mold of FIG. 45.

Because the mold 55 and cast article 63 must be removed from any closable support structure 50 in order to remove the mold 55 from the cast article 63, the side 56 may need to be openable, such as shown in FIG. 44. This allows the removal of the mold and cast article to then allow the removal of the cast article 63.

Where the cast article 63 is relatively flat there may be little advantage to a hollow 64. In these circumstances, the top may not have a protrusion area 60. In FIGS. 45-47, the top 52 is without any protrusion. The vents 58 may be in any location on the top.

Figure 48:
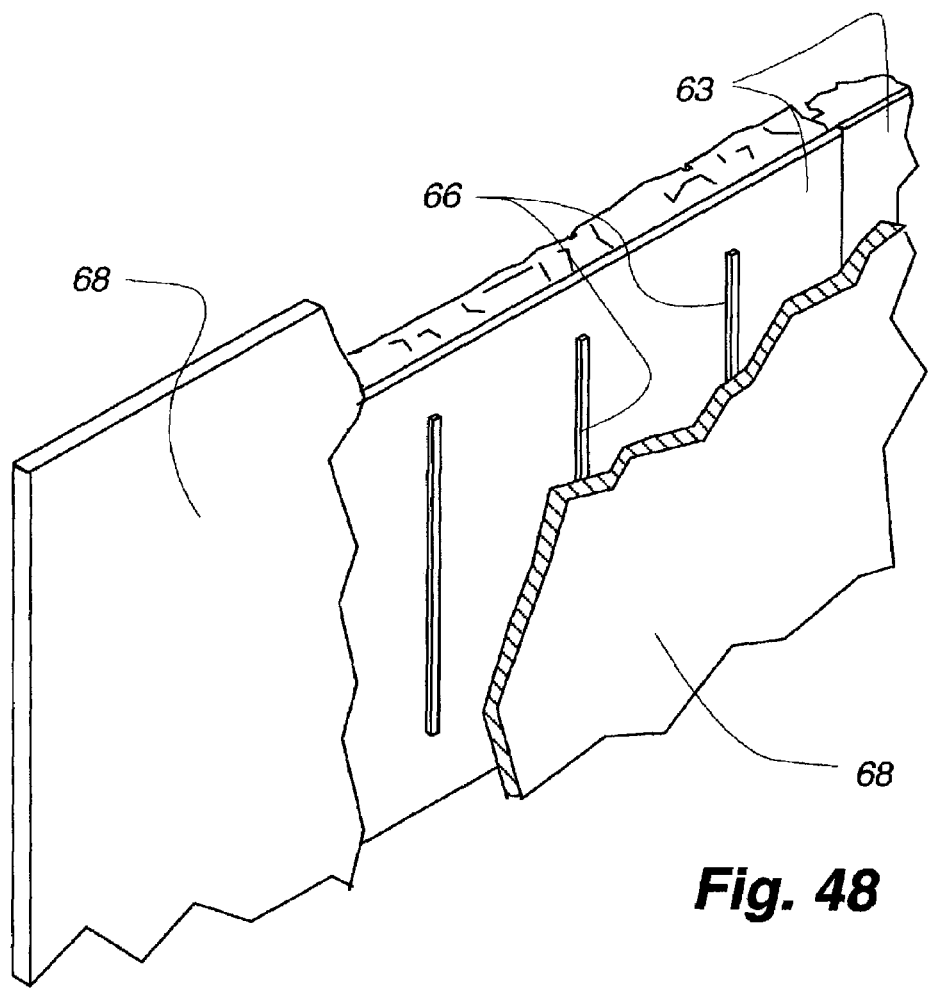
FIG. 48 illustrates the use of ribs formed by the vented top of of FIG. 45 in an installation as a flat construction surface to provide pathways.

The castable material that exits the vents 58 will form mounting aids such as ribs 66 in FIG. 47 when the cast material hardens. These ribs may be removed or trimmed to a particular configuration for mounting. One example of using the ribs 66 as a mounting aid is in circumstances of mounting the cast article 63 against a flat construction wall 68 as seen in side view in FIG. 48. The ribs 66 act as spacers to keep the back side of the cast article 63 separated from the construction wall 68. This has advantages in that moisture is not trapped in this area, as the spacing allows for drainage and the escape of any moisture. This helps to prevent mold and rot in walls using these methods.

MATERIALS

Several different types of materials are required to carry out the invention described herein. Generally speaking, applicant's principal required materials include: (1) those material(s) from which the cast reproductions and the cast articles are made, (2) those material(s) from which the molds are made and (3) those materials from which the coloring agents are made. Various materials within these three groups may be selected depending upon whether an original article to be replicated is a manmade object (e.g., the surface of a wall constructed from an array of bricks or stones, a carved item, such as la decoratively carved panel or a machined object, such as a mold component) or an object found in nature (e.g., a stone having a surface that one desires to replicate).

The materials from which applicant's master reproductions and or cast articles are made preferably will be those thermoset polymers (thermoset resins) that produce extremely hard, rigid items having the mechanical strength and dimensional stability required of a given master reproduction and/or cast article. Most preferably, the thermoset polymer(s) selected also should be able to accept pigment coloration in general and metal oxide pigment coloration in particular (especially during a thermoset polymer curing process). Some of the more preferred thermoset polymers for the practice of this invention will include, but not be limited to: (1) urethanes, (2) phenolics, (3) epoxies, (4) alkyds, (5) allylics, (6) aminos (melamine and urea), (7) polyesters and (8) silicones. More specific thermosetting resin materials that may be especially preferred for the practice of this invention may include, but by no means be limited to: (1) polyether polyurethane, (2) polyester polyurethane, (3) polyvinylchloride, (4) polycarbonate, (5) polypropylene and (6) epoxy resin. Those skilled in this art also will appreciate that almost all commercially available thermoset polymers contain various additives. Such additives often include catalytic agents, stabilizers, fillers, colors, plasticizers, flame retardants, blowing agents, cross-linking agents and other more specialized agents, such as ultraviolet light inhibitors and fungicidal agents.

Again, the polyurethane materials most preferred for the practice of this invention are those rigid polyurethane materials whose ingredients are made and/or sold by Urethane Technologies Corporation of Newburgh, N.Y. under their designation "UTC-6022-7.5FR". Their particular ingredient system is provided in two components: Part A and Part B. To the best of applicant's knowledge, Part A is a resin component containing polyols, blowing agents, catalytic agents and having a viscosity of 150-350 cps at 77° F. and a specific gravity of 1.22 to 1.24 at 77° F. Part B is a polyisocyanate component containing polymethylene, polyphenyl, isocyanate and having a viscosity of 1000 to 1200 cps and a specific gravity of 1.10 at 77° F. When appropriately mixed, and dispensed (e.g., by casting, spraying, etc.) these two main ingredients produce a cured polyurethane material having a density that ranges from about 5 pounds per cubic feet to about 25 pounds per cubic feet. The preferred mixing ratio of component A (UTC-6022-7.5 FRA) to component B (UTC-6022-7.5 FRB) is about 1:1 by weight. The reactivities of these ingredients, at 77° F., are as follows: (1) cream time 48-52 seconds, (2) string gel time 1 minute to 1 minute and 20 seconds, (3) rise time 4 minutes and 5 seconds to 4 minutes and 25 seconds, free rise core density 7.0-7.5 pounds/ft$^3$ and mold dwell time 8 to 9 minutes. These two components can be dispensed (e.g., by a hand, mixing gun, etc.) and reacted (e.g., at temperatures of 60-250° F.) in ways known to those skilled in this art.

In certain somewhat less preferred embodiments of this invention, ceramic materials can be employed to make a first casting (e.g., to make a master reproduction) and/or a second casting (e.g., cast article). It also should be noted that such first castings (and in some cases even a second casting) can be made of non-polymeric materials such as ceramic materials, clays, plaster of Paris and the like. Those skilled in this art will also appreciate that the most essential ingredient in a ceramic material is clay (a hydrated compound of aluminum and silicon $H_2 Al_2 Si_2 O_9$, but also containing relatively small amounts of various other compositions, such as ferric oxide $Fe_2O_3$, silica $SiO_2$, calcium carbonate $CaCo_3$). Other ingredients commonly found in clays include feldspar, quartz and dolomite. Be that as it may, one of the points to be made here is that the first and/or second materials (e.g., thermosetting polymers, ceramic materials, metals, etc.) that are respectively placed in the first and/or second mold should be castable materials that are capable of faithfully replicating the details of the surface of the original object and then curing (or drying or cooling) to form a solid, hard material that also faithfully replicates the details of the surface of the original object.

The materials from which the first and/or second molds are made can be flexible or inflexible end product materials (e.g., flexible polymers, inflexible polymers, crystalline materials, metal castings and the like). Most preferably, the polymeric materials employed for the second molds will be those that produce flexible molds having the mechanical strength, durability and flexibility needed for repeated use of said second molds. The materials from which these second molds are made also should: (1) be able to repeatedly withstand those temperatures (e.g., temperatures up to about 300° Fahrenheit) used to create and/or cure the ingredients from which a given cast article is made, (2) not chemically or mechanically bond with a given second castable material (e.g., a thermosetting resin) being employed and (3) not take up large quantities (e.g., more than 10% of its weight) of the liquid used to create the coloring agent/liquid suspensions that may be employed in the practice of this invention. Some of the more preferred flexible mold materials are those polymers whose final forms display the above noted qualities. Some of the more preferred mold-making materials are of silicone based materials and especially so-called "silicone rubbers." The most preferred silicone based material for the practice of the herein disclosed invention is a silicone rubber made and sold by Rhodia, VSI of Troy, N.Y. as their "VI-SIL, V-1065-S" product. Such silicone rubbers will preferably have a durometer reading from about 15 to about 75.

Again, the materials from which the first mold is made also can be flexible or inflexible end product materials (e.g., flexible polymers, inflexible polymers, crystalline materials, metal castings and the like). For example, they can be made from the same mold materials used to make the preferred second molds (e.g., silicone rubber) or the same "inflexible" polymer materials from which the end products are made. Indeed, even non-polymeric materials, such as ceramic materials, plaster of Paris, or even metal castings could be employed. The materials from which the first molds are made will not normally be repeatedly used, or be used in conjunction with coloring agents. Hence, there will generally be more latitude in selecting the material(s) for making a given first mold relative to the material(s) that can be selected for making a given second mold.

The preferred powdered coloring agent(s) for the practice of this invention is (are) one or more inorganic pigment(s). Such inorganic pigments may include, but are not limited to: (1) metal oxides (e.g., oxides of iron, titanium, zinc, cobalt, chromium, etc.), (2) metal powder suspensions (e.g., suspensions of gold, silver, tin, copper, bronze, etc.), (3) earth colors (e.g., siennas, ochers, umbers, etc.), (4) carbon black and/or mixtures thereof. Of these, the more preferred inorganic pigments are metal oxides and/or carbonates, and especially those of iron. These inorganic pigments are especially efficacious in producing the coloring schemes displayed by certain stones found in nature. They also are particularly effective in coloring the surfaces of many different thermosetting resin materials. Particularly preferred iron oxide compounds or compositions in this regard are: (1) iron oxide, metallic brown (a naturally occurring earth, principally ferric oxide, to which various extenders are normally added), (2) iron oxide, yellow (hydrated ferric oxide, which is a precipitated pigment of finer particle size and greater tinctorial strength than the naturally occurring oxides, such as ocher, and having particularly good lightfastness qualities), (3) iron oxide, black (ferrosoferric oxide, ferroferric oxide, black rouge), (4) iron oxide, red (e.g., pigments of ferric oxide commonly referred to as burnt sienna, Indian red, red iron oxide, red oxide, Turkey red and rouge) and (5) ferric oxide (ferric oxide, red, iron oxide, red iron trioxide and ferric trioxide). A particularly preferred iron carbonate coloring agent is iron "oxide", brown (iron carbonate, iron subcarbonate, which are usually employed with ferric hydroxide and ferrous hydroxide in varying concentrations). Titanium dioxide is a particularly preferred coloring agent when a white color is desired (a white color alone, or in a coloring system needing a white color component). It also should be appreciated that use of mixtures of any such pigments may be particularly preferred for the practice of the herein disclosed invention, especially when trying to imitate the colors of certain stones (e.g., so-called sandstones) found in nature.

In certain other particularly preferred embodiments of this invention, a powdered inorganic coloring agent ingredient will be the main component of a coloring composition that further comprises certain secondary ingredients. These secondary ingredients may be pigment binders, ultraviolet light inhibitors, flame retardant agents, anti-microbial agents, insect repellants, extenders and the like. If used at all, these secondary ingredients will preferably comprise no more than about 30% by weight of the powdered, inorganic coloring agent ingredient/secondary ingredient composition. Coloring agent compositions having from about 5% to about 20% (by weight) of such secondary ingredients are somewhat more preferred. A particularly preferred pigment binder or film-forming ingredient for creating applicant's powdered, inorganic coloring agent/secondary ingredient coloring formulations will be binder materials comprised of mixtures of silicone dioxide (30-70% by weight of the binder mixture) and polytetrafluoroethylene (30-70% by weight of the binder mixture). Applicant especially prefers those pigment binders marketed by Development Associates, Inc. of North Kingstown, R.I. under their product name "Z-8261".

Suitable ultraviolet absorbers for the practice of this invention may include, but are not limited to, benzophenones, benzotriazoles, substituted acrylonitriles and phenolnickel complexes. Suitable flame-retarding agents may include, but are not limited to, chlorinated organic compounds, such as chlorendic anhydride, alumina trahydrate, ammonium sulfamate, zinc borate and various organic phosphates and phosphonates. Suitable fungicides may include, but are not limited to copper oxychloride, copper naphthenate and dithiocarbamate. Most preferably, such ultraviolet absorbers, flame-retarding agents, fungicides and the like will not, in total, constitute more than about 8% by weight of the total weight of the end product.

In yet another highly preferred embodiment of this invention, the coloring agents are dispensed into a second flexible mold cavity in a powdered form. For example, such powders could be simply sprinkled, brushed, blown, etc., in their powdered forms, into the cavity or cavities of the second mold prior to filling said mold with the second castable (e.g., a thermosetting resin material). In the most preferred embodiments of this invention, however, the powdered coloring agent(s) become a component of a coloring agent suspension that is placed in, or created in, the cavity or cavities of the second mold before the second castable material(s) is (are) poured, injected, blown, etc. into said cavity or cavities. That is to say that, in this highly preferred embodiment, before the second castable material(s) is (are) poured, injected, sprayed, etc. into the second mold cavities, the powdered coloring agent becomes a component of a two (or more) phase coloring system. One phase is comprised of the particles of the powdered coloring agent(s) and their associated secondary ingredients (if any) and a second phase is comprised of a liquid suitable for creating a powdered coloring agent/liquid suspension used to impart the pigment color(s) to the mold side surface of the cast article (i.e., to the "face side" of the end product of this production method). In a less preferred, but still operable alternative, such a powdered coloring agent/liquid suspension can be pre-formulated and then introduced into (e.g., by spraying, brushing, etc.) the cavities of the second mold. Such a suspension also could be an added ingredient of an entire composition (e.g., polyurethane/powdered coloring agent/liquid suspension) from which a second thermosetting resin(s) material(s) is (are) made in a thermosetting reaction.

In another particularly preferred embodiment of this invention, the powdered coloring agent/liquid suspension will be created in the following manner. First, one or more coloring agents (in powdered form) are introduced (e.g., by sprinkling, spraying, brushing, etc.) into one or more cavities of a second, flexible polymer, mold. An appropriate suspension creating liquid is then sprayed over the powdered inorganic pigments (in the alternative, the liquid could be sprayed into the cavities first and the powdered coloring agent added thereafter). These two materials are then mixed (preferably by brush stroke action) to form the desired powdered coloring agent/liquid suspension ("the resulting suspension"). The resulting suspension will generally have the consistency of wet paint or stain. In some of the most preferred embodiments of this invention the brushing action (e.g., by human hand) should be sufficient to create the suspension, but not sufficient enough to create a thoroughly homogeneous pigment/liquid composition. This lack of homogeneity serves to create regions (e.g., streaks) having different colors and this quality generally tends to give the resulting cast reproduction a more "natural" (e.g., stonelike) appearance. That is to say that products colored in this way tend to better replicate the colors, texture, and visual appearance of certain natural objects such as certain stones.

The liquid(s) used to create the coloring agent/liquid suspension is (are) preferably polar solvents (e.g., an alcohol, such as ethyl alcohol, methyl alcohol and the like, water and/or weak acids). Most preferably the polar solvent(s) employed is (are) not corrosive toward, or readily absorbed by, the material (e.g., silicone) from which the second mold is made. In the case of using iron oxide type inorganic pigments in the practice of this invention, denatured alcohol is a particularly preferred liquid for the creation of applicant's powdered coloring agent/liquid suspensions.

Those skilled in this art will appreciate that the embodiments discussed above are exemplary of the present invention. They are not, however, intended to limit the scope of the claims of this patent application. Many other substances and techniques, different from those discussed above, can be used. That is to say that all changes and modifications that come within the spirit of the present invention are intended to be protected by the following patent claims.

The embodiments discussed above are merely exemplary of the invention of this application. They are not intended to limit the scope of the claims of this application in any respect. Many substances and techniques different from those discussed above can be used in practicing the invention of the application, and a wide range of techniques can be used for that purpose. Only preferred embodiments and minor variants thereof have been shown and described above, and all changes and modifications that come within the spirit of the invention are intended to be protected.

I claim:

1. A method for making a cast article replicating on a part of the surface thereof, a portion of a surface of one of a natural stone article or a brick article, said method comprising:
making a first mold that replicates in a first negative reproduction at least said surface portion of the one stone or brick article;
filling said first mold with a first castable material;
curing the first castable material in the first mold to produce a master reproduction, the master reproduction including a first positive reproduction of the first negative reproduction, the first positive reproduction replicating said surface portion of the one stone or brick article;
making a flexible second mold that replicates the first positive reproduction of the master reproduction as a second negative reproduction of said surface portion of the one stone or brick article, the second mold having a cavity which includes the second negative reproduction;
placing said second mold in a closable support structure made from rigid material, the closable support structure comprising a bottom to support the second mold and a top to cover the cavity of the second mold, the bottom supporting the second mold with the cavity facing the top when closed;
closing the top over the cavity of the second mold;
filling said second mold between the cavity and the closed top with a
second castable material; and
curing the second castable material within the cavity while the top is closed to produce said cast article having a front exterior surface area formed as a second positive reproduction from the second negative reproduction, the front exterior surface area replicating said surface portion of the one stone or brick article.

2. The method of claim 1 further including:
using said second mold to produce a plurality of said cast articles.

3. The method of claim 1 wherein said cast article includes a rear surface area opposite from the front exterior surface area, the rear surface area is formed by the top of the closable support structure, and the top is lined with an inert material to prevent adhesion of said second castable material.

4. The method of claim 1 further including:
venting any excess second castable material in the second mold from the closable support structure.

5. The method of claim 1 further including:
venting excess second castable material in the second mold from the closable support structure; and
forming at least one mounting on the cast article from the vented excess second castable material.

6. The method of claim 1 further including:
placing at least one powdered coloring agent into the cavity of the second mold.

7. The method of claim 1 further including:
placing at least one liquid coloring agent into the cavity of the second mold.

8. The method of claim 1 further including:
mixing at least one coloring agent into the second castable material.

9. The method of claim 1 further including:
adding a protective agent to the second castable material.

10. The method of claim 1 further including:
making at least one additional mold by using the cast article as a
second master reproduction.

11. The method of claim 1 wherein at least one of the first mold and the second mold comprises silicone.

12. The method of claim 1 wherein at least one of the first castable material and second castable material comprises polyurethane.

13. The method of claim 1 wherein said surface portion of the one stone or brick article has a surface texture and the cast article is a masonry wall panel having a surface texture on the front exterior surface area replicating the surface texture of said surface portion of one stone or brick article.

14. The method of claim 1 further including:
forming at least one mounting aid on the cast article as part of curing the second castable material.

15. The method of claim 1 further including:
placing said second mold on a first conveyor;
conveying said second mold to a dispenser of said second castable material;
filling the cavity of said second mold from said dispenser with said second castable material; and
confining said second castable material to between the cavity said second mold.

16. The method of claim 15 further including:
positioning a second conveyor adjacent to said first conveyor to interact the second conveyor with second mold while conveyed by the first conveyor to confine the second castable material to the second mold; and
confining the second castable material to the second mold by interaction of the second conveyor with the second mold.

17. The method of claim 15 further including:
introducing a powdered coloring agent into the cavity of said second mold while said second mold is positioned on said first conveyor.

18. The method of claim 15 further including:
introducing a liquid coloring agent into the cavity of said second mold while said second mold is positioned on said first conveyor.

19. The method of claim 1 wherein said closable support structure further comprises a closing mechanism to place the top against the second mold.

20. The method of claim 1 further including:
applying pressure to compress the top and bottom of the closable support structure toward each other.

21. The method of claim 1 wherein the top of the closable support structure has at least one vent to allow excess second castable material to exit.

22. The method of claim 1 wherein the top of the closable support structure protrudes into the second mold.

23. The method of claim 1, further including:
modifying the master reproduction to create a configuration for installing multiple ones of the cast articles adjacent to one another as panels; and
using the modified master reproduction to make the second mold.

24. The method of claim 6 further including:
placing the powdered coloring agent into the cavity of the second mold before filling the second mold with the second castable material.

25. The method of claim 24 further including:
imparting the powdered coloring agent as part of the front exterior surface area of the cast article.

26. The method of claim 25 wherein the powdered coloring agent comprises metal oxide.

27. The method of claim 25 wherein the powdered coloring agent comprises powdered cement.

28. The method of claim 25 further including:
creating a texture as part of the front exterior surface area of the cast article by imparting the powdered coloring agent as part of the front exterior surface area of the cast article.

29. The method of claim 25 further including:
wetting the powdered coloring agent with a liquid wetting agent within the cavity of the second mold before filling the second mold with the second castable material.

30. The method of claim 29 further including:
mixing the liquid wetting agent and the powdered coloring agent in the cavity of the second mold before filling the second mold with the second castable material.

31. The method of claim 30 further including:
brushing the powdered coloring agent and the liquid wetting agent to form a liquid suspension within the cavity of the second mold.

32. The method of claim 30 further including:
drying the liquid suspension within the cavity of the second mold before filling the second mold with the second castable material.

33. The method of claim 25 further including:
placing a plurality of different powdered coloring agents into the cavity of the second mold and distributing the different powdered coloring agents among themselves before filling the cavity of the second mold with the second castable material.

34. The method of claim 7 further including:
placing the liquid coloring agent into the cavity of the second mold before filling the second mold with the second castable material.

35. The method of claim 34 further including:
distributing the liquid coloring agent within the cavity of the second mold before filling the second mold with the second castable material.

36. The method of claim 34 further including:
placing a plurality of different liquid coloring agents into the cavity of the second mold and distributing the different liquid coloring agents within the cavity of the second mold before filling the second mold with the second castable material.

37. A method for making a cast article replicating on at least a part of the surface thereof, a portion of a surface of one of a natural stone article or a brick article, said method comprising:
making a first flexible mold that replicates in a first negative reproduction said surface portion of the one stone or brick article;
lining an inner surface of a first support structure with said first flexible mold so that the first negative reproduction of said first flexible mold faces away from the inner surface of said first support structure;
filling said first support structure with a first castable material;
curing the first castable material in the first mold to produce a master reproduction of said first flexible mold in said first support structure, the master reproduction including a first positive reproduction of the first negative reproduction, the first positive reproduction replicating said surface portion of the one stone or brick article;
inserting said master reproduction into a second support structure;
making a flexible second mold of said master reproduction while inserted in the second support structure, the second mold having a cavity which includes a second negative reproduction formed from the first positive reproduction;
placing said second mold in a closable support structure made from rigid material, the closable support structure comprising a bottom to support the second mold and a top to cover the cavity of the second mold, the bottom supporting the second mold with the cavity facing the top when closed;
closing the top over the cavity of the second mold;
filling said second mold between the cavity and the closed top with a second castable material; and
curing the second castable material within the cavity while the top is closed to produce said cast article having a front exterior surface area formed as a second positive reproduction from the second negative reproduction, the front exterior surface area replicating said surface portion of the one stone or brick article.

38. The method of claim 37 further comprising using said second mold to produce a plurality of said cast articles.

39. The method of claim 37 wherein at least one of said first and second support structures is rigid.

40. The method of claim 39 wherein said cast article includes a rear surface area opposite from the front exterior surface area, the rear surface area is formed by the top of the closable supnort structure, and the top is lined with an inert material to prevent adhesion of said second castable material.

41. The method of claim 37 further comprising placing at least one powdered coloring agent into the cavity of the second mold.

42. The method of claim 37 further comprising placing at least one liquid coloring agent into the cavity of the second mold.

43. The method of claim 37 further comprising mixing at least one coloring agent into the second castable material.

44. The method of claim 37 further comprising adding a protective agent to the second castable material.

45. The method of claim 37 further including making at least one additional mold by using the cast article as a second master reproduction.

46. The method of claim 37 wherein at least one of the first and second molds comprises silicone.

47. The method of claim 37 wherein at least one of the first and second castable materials comprises polyurethane.

48. The method of claim 37 wherein said surface portion of the one stone or brick article has a surface texture and said cast article is a masonry wall panel having an outside surface texture replicating the surface texture of said surface portion of the one stone or brick article.

49. The method of claim 37 further including:
positioning said second mold on a first conveyor;
positioning a dispenser adjacent to said first conveyor for filling the cavity of said second mold with the second castable material.

50. The method of claim 49 further including:
positioning at least one color additive dispenser adjacent to said first conveyor for placing a coloring agent into the cavity of said second mold; and
placing the coloring agent into the cavity of said second mold with the color additive dispenser.

51. The method of claim 49 further including:
positioning at least one dispenser of solvent adjacent to said first conveyor for applying solvent into the cavity of said second mold; and
applying solvent into the cavity of said second mold from the dispenser of solvent.

52. The method of claim 49 further including:
positioning at least one dispenser of a protective additive relative to said first conveyor; and
adding the protective additive into the second castable material from the dispenser of the protective additive.

53. The method of claim 51 further including:
drying the cavity of said second mold with a heater before filling said second mold with the second castable material.

54. The method of claim 41 further including:
placing the powdered coloring agent into the cavity of the second mold before filling the second mold with the second castable material.

55. The method of claim 54 further including:
imparting the powdered coloring agent as part of the front exterior surface area of the cast article.

56. The method of claim 55 wherein the powdered coloring agent comprises metal oxide.

57. The method of claim 55 wherein the powdered coloring agent comprises powdered cement.

58. The method of claim 55 further including:
creating a texture as part of the front exterior surface area of the cast article by imparting the powdered coloring agent as part of the front exterior surface area of the cast article.

59. The method of claim 55 further including:
wetting the powdered coloring agent with a liquid wetting agent within the cavity of the second mold before filling the second mold with the second castable material.

60. The method of claim 59 further including:
mixing the liquid wetting agent and the powdered coloring agent in the cavity of the second mold before filling the cavity of the second mold with the second castable material.

61. The method of claim 60 further including:
brushing the powdered coloring agent and the liquid wetting agent to form a liquid suspension within the cavity of the second mold.

62. The method of claim 60 further including:
drying the liquid suspension within the cavity of the second mold before filling the second mold with the second castable material.

63. The method of claim 55 further including:
placing a plurality of different powdered coloring agents into the cavity of the second mold and distributing the different powdered coloring agents among themselves before filling the cavity of the second mold with the second castable material.

64. The method of claim 42 further including:
placing the liquid coloring agent into the cavity of the second mold before filling the cavity of the second mold with the second castable material.

65. The method of claim 64 further including:
distributing the liquid coloring agent within the cavity of the second mold before filling the cavity of the second mold with the second castable material.

66. The method of claim 64 further including:
placing a plurality of different liquid coloring agents into the cavity of the second mold and distributing the different liquid coloring agents within the cavity of the second mold before filling the cavity of the second mold with the second castable material.

* * * * *